US012645503B1

(12) United States Patent
Shyshkova et al.

(10) Patent No.: US 12,645,503 B1
(45) Date of Patent: Jun. 2, 2026

(54) SECURED TRANSFER MEDIUM MANAGEMENT AND GRADUATION

(71) Applicant: THE HUNTINGTON NATIONAL BANK, Columbus, OH (US)

(72) Inventors: Kateryna Shyshkova, Columbus, OH (US); Harmeet S. Soin, Columbus, OH (US); Jatin Patel, Columbus, OH (US); James P. Fairall, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/264,286

(22) Filed: Jul. 9, 2025

Related U.S. Application Data

(63) Continuation of application No. 19/033,142, filed on Jan. 21, 2025, now Pat. No. 12,379,968.

(51) Int. Cl.
G06F 9/50 (2006.01)

(52) U.S. Cl.
CPC .......... G06F 9/5061 (2013.01); G06F 9/5088 (2013.01); *G06F 2209/5013* (2013.01); *G06F 2209/5022* (2013.01)

(58) Field of Classification Search
CPC ................. G06F 9/5061; G06F 9/5088; G06F 2209/5013; G06F 2209/5022
See application file for complete search history.

(56) References Cited

U.S. PATENT DOCUMENTS

| | | | |
|---|---|---|---|
| 5,724,523 A | 3/1998 | Longfield | |
| 6,208,978 B1 | 3/2001 | Walker et al. | |
| 6,315,196 B1 | 11/2001 | Bachman | |
| 6,339,766 B1 | 1/2002 | Gephart | |
| 6,877,656 B1 | 4/2005 | Jaros et al. | |
| 7,896,237 B2 | 3/2011 | Giesen et al. | |

(Continued)

OTHER PUBLICATIONS

U.S. Appl. No. 19/033,769, "Final Office Action", Jul. 17, 2025, 23 pages.

(Continued)

*Primary Examiner* — April Y Blair
(74) *Attorney, Agent, or Firm* — Kilpatrick Townsend & Stockton LLP

(57) ABSTRACT

Techniques are described herein for resolving an unsuccessful transition from a secured transfer medium to an unsecured transfer medium. A transfer medium module can transmit a graduation request to an orchestration platform to initiate a transition of the secured transfer medium to the unsecured transfer medium. The secured transfer medium can be assigned to an entity after a portion of entity resources is received from the entity. The transfer medium module can determine whether the transition to the unsecured transfer medium is successful. In response to determining that the transition is unsuccessful, the transfer medium module can evaluate a transfer error associated with the transition being unsuccessful. The transfer medium module can evaluate the transfer error based on information received from a communication channel. The transfer medium module can determine a remediation action to resolve the transfer error. Additionally, the transfer medium module can perform the remediation action.

12 Claims, 8 Drawing Sheets

(56) References Cited

U.S. PATENT DOCUMENTS

| | | | |
|---|---|---|---|
| 8,274,365 B2 * | 9/2012 | Piccirillo | E05B 67/00 |
| | | | 340/5.74 |
| 10,424,170 B1 | 9/2019 | Benkreira et al. | |
| 2003/0018552 A1 | 1/2003 | Colabella | |
| 2003/0046222 A1 | 3/2003 | Bard et al. | |
| 2003/0105689 A1 | 6/2003 | Chandak et al. | |
| 2004/0260642 A1 | 12/2004 | Puleo et al. | |
| 2006/0031158 A1 | 2/2006 | Orman | |
| 2006/0259390 A1 | 11/2006 | Rosenberger | |
| 2007/0045406 A1 | 3/2007 | Giesen et al. | |
| 2007/0073616 A1 | 3/2007 | Silbernagel et al. | |
| 2007/0087816 A1 | 4/2007 | Vanluchene | |
| 2008/0005014 A1 | 1/2008 | Smith | |
| 2008/0021802 A1 | 1/2008 | Pendleton | |
| 2009/0171834 A1 | 7/2009 | Liu et al. | |
| 2010/0057609 A1 | 3/2010 | Sibson | |
| 2014/0201060 A1 | 7/2014 | Rice et al. | |
| 2014/0236807 A1 | 8/2014 | Bard et al. | |
| 2018/0165675 A1 | 6/2018 | Isaacson et al. | |
| 2018/0219838 A1 * | 8/2018 | Eldridge | G06F 11/3409 |
| 2019/0370604 A1 | 12/2019 | Galitsky | |
| 2020/0004983 A1 * | 1/2020 | Chen | H04L 9/0819 |
| 2021/0352047 A1 * | 11/2021 | Singh | H04L 61/2592 |
| 2022/0103359 A1 * | 3/2022 | Zheng | G06F 9/545 |
| 2024/0046756 A1 | 2/2024 | Richards et al. | |
| 2024/0135343 A1 | 4/2024 | Nazari et al. | |

OTHER PUBLICATIONS

U.S. Appl. No. 19/033,769, "Non-Final Office Action", Mar. 21, 2025, 18 pages.

Santucci, "The secured credit card market", FRB of Philadelphia Payment Cards Center Discussion, Nov. 2016, 31 pages.

U.S. Appl. No. 19/033,769, "Notice of Allowance", Nov. 20, 2025, 12 pages.

* cited by examiner

RECEIVE A TERMINATION REQUEST INITIATED BY AN ENTITY TO
DEACTIVATE A SECURED TRANSFER MEDIUM
402

RETURN A RESPECTIVE PORTION OF ENTITY RESOURCES TO THE ENTITY
404

DEACTIVATE THE SECURED TRANSFER MEDIUM SUCH THAT THE ENTITY IS
UNABLE TO ACCESS SYSTEM RESOURCES USING THE SECURED TRANSFER
MEDIUM
406

400

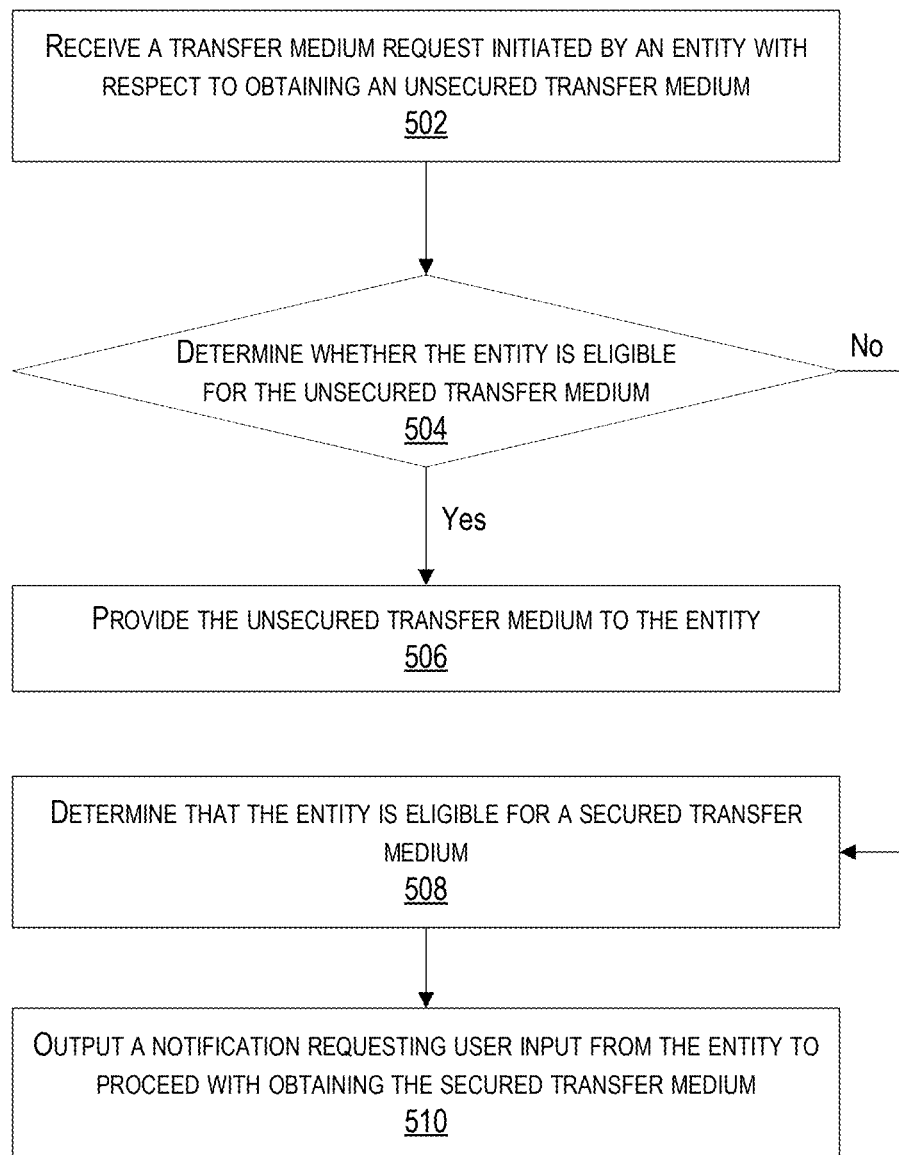

RECEIVE A TRANSFER MEDIUM REQUEST INITIATED BY AN ENTITY WITH RESPECT TO OBTAINING AN UNSECURED TRANSFER MEDIUM
502

DETERMINE WHETHER THE ENTITY IS ELIGIBLE FOR THE UNSECURED TRANSFER MEDIUM
504

No

Yes

PROVIDE THE UNSECURED TRANSFER MEDIUM TO THE ENTITY
506

DETERMINE THAT THE ENTITY IS ELIGIBLE FOR A SECURED TRANSFER MEDIUM
508

OUTPUT A NOTIFICATION REQUESTING USER INPUT FROM THE ENTITY TO PROCEED WITH OBTAINING THE SECURED TRANSFER MEDIUM
510

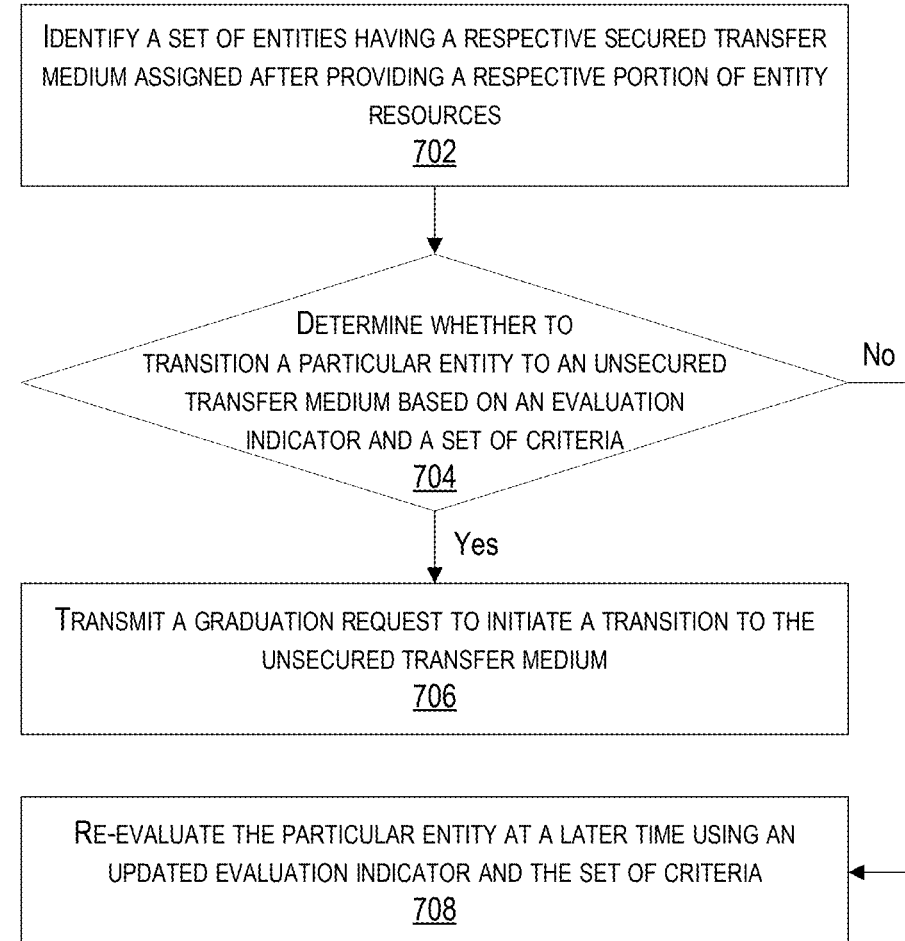

IDENTIFY A SET OF ENTITIES HAVING A RESPECTIVE SECURED TRANSFER MEDIUM ASSIGNED AFTER PROVIDING A RESPECTIVE PORTION OF ENTITY RESOURCES
702

DETERMINE WHETHER TO TRANSITION A PARTICULAR ENTITY TO AN UNSECURED TRANSFER MEDIUM BASED ON AN EVALUATION INDICATOR AND A SET OF CRITERIA
704

No

Yes

TRANSMIT A GRADUATION REQUEST TO INITIATE A TRANSITION TO THE UNSECURED TRANSFER MEDIUM
706

RE-EVALUATE THE PARTICULAR ENTITY AT A LATER TIME USING AN UPDATED EVALUATION INDICATOR AND THE SET OF CRITERIA
708

SECURED TRANSFER MEDIUM MANAGEMENT AND GRADUATION

CROSS-REFERENCE TO RELATED APPLICATION

This application is a continuation of U.S. patent application Ser. No. 19/033,142, filed Jan. 21, 2025, the entirety of which is hereby incorporated by reference.

TECHNICAL FIELD

This application generally relates to computer systems, and more particularly to systems, methods, and non-transitory, computer-readable media to facilitate secured transfer medium graduation or termination.

BACKGROUND

A transfer medium can be used by an originating entity to initiate one or more electronic transfer operations. The electronic transfer operations can involve transferring resources from the originating entity to one or more receiving entities, such as in exchange for a physical item or for a service provided by the receiving entities. Different types of transfer mediums can be available and may provide a respective set of functionalities. Each type of transfer medium may have a respective set of criteria by which eligibility of the originating entity can be determined to obtain a particular transfer medium. For instance, a secured transfer medium may have less stringent criteria compared to an unsecured transfer medium while providing fewer or different functionalities. In some cases, once certain conditions are met, the originating entity may undergo a graduation process by which the originating entity transitions from the secured transfer medium to the unsecured transfer medium.

BRIEF SUMMARY OF THE INVENTION

Techniques are provided for secured transfer medium management and graduation. Various embodiments are described herein, including methods, systems, non-transitory computer-readable storage media storing programs, code, or instructions executable by one or more processors, and the like.

One embodiment is directed to a computer-implemented method for transmitting, by a transfer medium module and to an orchestration platform, a graduation request to initiate a transition of a secured transfer medium to an unsecured transfer medium. The secured transfer medium can be assigned to an entity after a portion of entity resources is received from the entity. Additionally, the method can involve determining, by the transfer medium module, whether the transition to the unsecured transfer medium is successful. The method may further involve, in response to determining that the transition to the unsecured transfer medium is unsuccessful, transmitting, by a transfer medium module and to an orchestration platform, evaluating, by the transfer medium module and based at least on information received from a communication channel communicatively coupling the transfer medium module and the orchestration platform, a transfer error associated with the transition to the unsecured transfer medium being unsuccessful. Based on the transfer error, the transfer medium module can determine a remediation action to resolve the transfer error. The transfer medium module may perform the remediation action.

In some embodiments, a system includes one or more processors and one or more memories storing computer-executable instructions that, when executed by the one or more processors, causes the one or more processors to perform one or more operations. The operations can include transmitting, by a transfer medium module and to an orchestration platform, a graduation request to initiate a transition of a secured transfer medium to an unsecured transfer medium. The secured transfer medium can be assigned o an entity after a portion of entity resources is received from the entity. The operations additionally can include determining, by the transfer medium module, whether the transition to the unsecured transfer medium is successful. The operations can further include, in response to determining that the transition to the unsecured transfer medium is unsuccessful, evaluating, by the transfer medium module and based at least on information received from a communication channel communicatively coupling the transfer medium module and the orchestration platform, a transfer error associated with the transition to the unsecured transfer medium being unsuccessful. Based on the transfer error, the transfer medium module can determine a remediation action to resolve the transfer error. The transfer medium module may perform the remediation action.

In some embodiments, a non-transitory computer-readable storage medium storing computer-executable instructions that, when executed with one or more processors of a computing device, causes the computing device to perform one or more operations. The operations can include transmitting, by a transfer medium module and to an orchestration platform, a graduation request to initiate a transition of a secured transfer medium to an unsecured transfer medium. The secured transfer medium can be assigned o an entity after a portion of entity resources is received from the entity. The operations additionally can include determining, by the transfer medium module, whether the transition to the unsecured transfer medium is successful. The operations can further include, in response to determining that the transition to the unsecured transfer medium is unsuccessful, evaluating, by the transfer medium module and based at least on information received from a communication channel communicatively coupling the transfer medium module and the orchestration platform, a transfer error associated with the transition to the unsecured transfer medium being unsuccessful. Based on the transfer error, the transfer medium module can determine a remediation action to resolve the transfer error. The transfer medium module may perform the remediation action.

BRIEF DESCRIPTION OF THE DRAWINGS

Various embodiments in accordance with the present disclosure will be described with reference to the drawings, in which:

FIG. 5 is a block diagram illustrating an example method for providing an unsecured transfer medium or a secured transfer medium to an entity, in accordance with at least one embodiment;

FIG. 7 is a block diagram illustrating an example method for transitioning an entity from a secured transfer medium to an unsecured transfer medium, in accordance with at least one embodiment.

DETAILED DESCRIPTION

Figure 1:
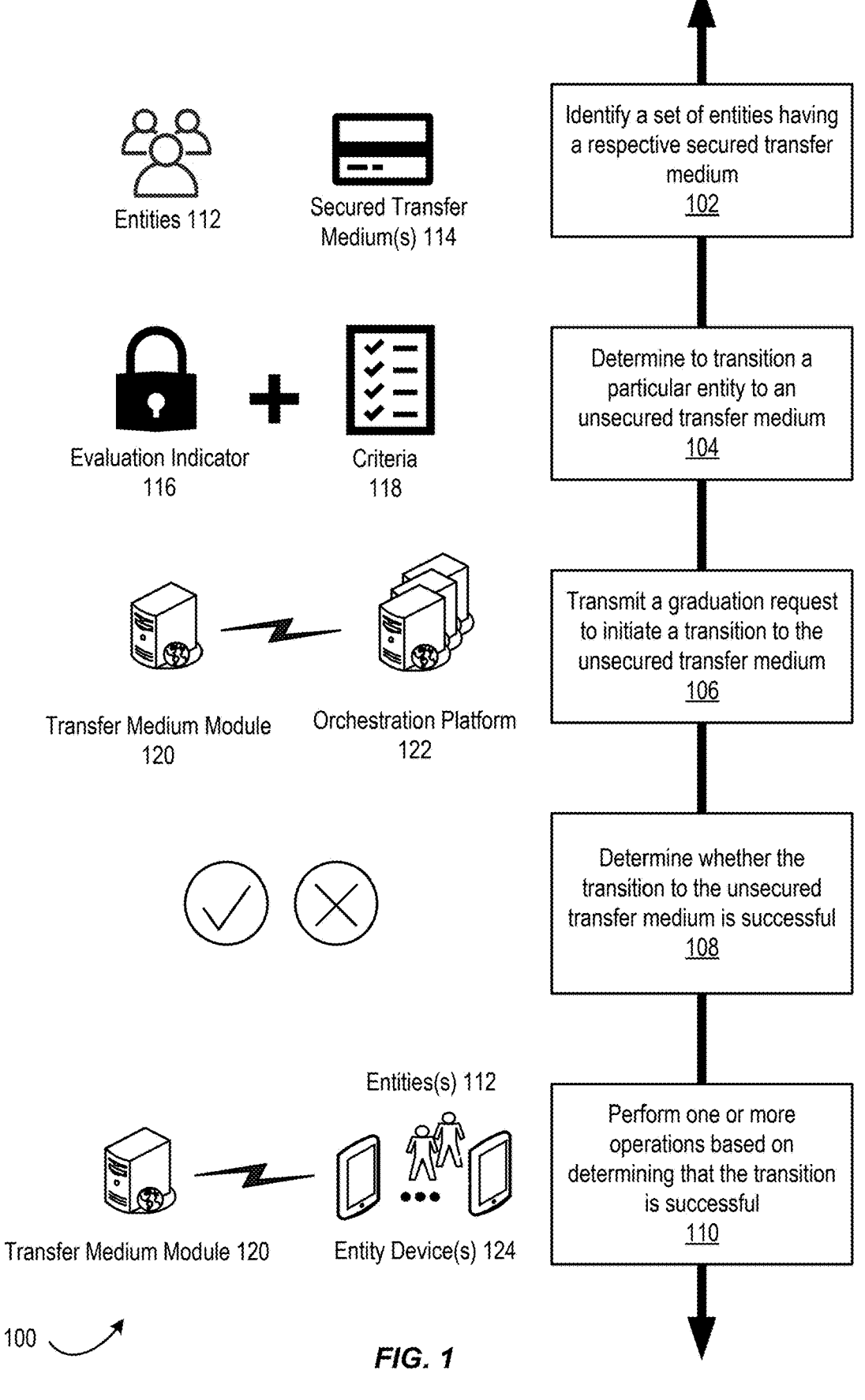
FIG. 1 is an example flow for transitioning an entity from a secured transfer medium to an unsecured transfer medium, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to transfer medium management, such as transfer medium graduation. In some embodiments, techniques are described for evaluating one or more entities to determine eligibility of the entities to be transitioned from a secured transfer medium to an unsecured transfer medium. Techniques are also described with respect to transitioning a particular eligible entity from the secured transfer medium to the unsecured transfer medium. In other embodiments, techniques are described for a termination process that involves deactivating a secured transfer medium. Various embodiments are described herein, including methods, systems, non-transitory computer-readable storage media storing programs, code, or instructions executable by one or more processors, and the like.

Some or all of the processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program including a set of instructions executable by one or more processing devices. The computer-readable storage medium may be non-transitory.

Transfer mediums can be used in various scenarios to initiate one or more transfer operations. A transfer medium management system can oversee transfer mediums, such as managing a status of the transfer mediums or implementing a transition from one type of transfer medium to a different type of transfer medium. Often, transfer medium management systems can include multiple distributed components that can communicate with each other or with external systems to implement one or more processes, such as a transition process or the termination process. Conventionally, the transition process can involve multiple communications with respect to one or more internal components or external systems to complete the transition process. For instance, the conventional transition process can include multiple calls to an external system to facilitate data retrievals from and updates to a database system of the transfer medium management system. Such communication can be resource-intensive and time-consuming. Additionally, in some cases, certain data retrievals or updates performed as part of the conventional transition process may depend on a respective completion of other calls, such as a prior call. By way of example, a call transmitted by a transfer medium management system to an external system to retrieve specific data may be unresolved until a different call transmitted by the external system to a particular database is resolved (e.g., a response is received from the particular database).

Transfer medium management systems can oversee various types of transfer mediums, including secured transfer mediums. Obtaining a secured transfer medium typically requires an amount of entity resources from an entity, such as to function as collateral. Conventional termination processes of secured transfer mediums can involve returning the entity resources to the entity. This return process is typically performed manually, which can be time-consuming and error-prone. For instance, a conventional termination process can include personnel performing a manual review of documents or other text-based information and providing manual input to the transfer medium management system to deactivate a secured transfer medium and return the entity resources. In some cases, the manual review can involve an operator verifying entity identifiers or other alphanumeric sequences by comparing separate sequences displayed in different user interfaces. The user interfaces may prevent the operator from copying or otherwise interacting with the displayed sequences. Additionally, the sequences can have a certain minimum length (e.g., at least ten characters) which can serve as a security measure, such as to minimize unauthorized copying. But lengthy sequences can be difficult or time-consuming to manually compare while ensuring an accurate verification. Additionally, certain conventional termination processes can involve the personnel manually inputting user input via the user interfaces. By way of example, the personnel can manually retrieve an entity identifier from a user interface and manually input the entity identifier into a different user interface as part of performing the termination process. Other user input may be requested to navigate the user interfaces or to provide suitable authentication factors as part of a verification process to access sensitive information.

The disclosed techniques described herein provide improvements to a transition process of transfer mediums by reducing a number of communications to perform the transition process. The disclosed methods may include fewer calls to external systems compared to the conventional transition process, resulting in reduced resource usage and faster response times. For instance, the transfer medium management system described herein can use a single application programming interface (API) call to communicate with an external system to perform the transition process. A single call can be more lightweight and less resource-intensive compared to using multiple calls as implemented in the conventional transition process. Additionally, reducing the number of communications to perform the transition process can reduce delays in the transition process. For instance, Additionally, the disclosed techniques described herein provide improvements to a termination process of a secured transfer medium by automating a return process of entity resources to the entity that originally provided the entity resources. The automated return process can involve the transfer medium management system communicating with an external system to initiate the return process and determine a suitable amount of entity resources to return to the entity. The transfer medium management system described herein can facilitate the return process by forgoing manual review or input. By way of example, the transfer medium management system can automate a comparison of separate sequences to verify whether the sequences match, which can be more efficient and quicker than personnel manually reviewing the sequences. Additionally, the transfer medium management system can automate the return process to avoid manual input that can be error-prone (e.g., an operator typing in '1000' rather than '100').

Moving on to FIG. 1 which illustrates an example flow 100 for transfer medium graduation in accordance with at least one embodiment. The operations discussed in connection with FIG. 1 may be performed with or performed by a transfer medium management system. The transfer medium management system can manage a graduation process for one or more transfer media by which one or more entities of a set of entities 112 can undergo a transition from a secured transfer medium 114 to an unsecured transfer medium. In some embodiments, the transfer medium management system may be implemented by one or more computer(s), as a service, within an application, or the like. Additional details related to the transfer medium management system are described below, such as with respect to FIG. 6. The operations discussed in connection with FIG. 1 may be performed in any suitable order. More or fewer operations than those depicted in FIG. 1 may be employed without diverting from this disclosure.

The flow 100 may begin at block 102, where the transfer medium management system identifies the set of entities 112 having a respective secured transfer medium 114. In some embodiments, the entities 112 can include computing devices, servers, organizations, systems, people, or a combination thereof. The secured transfer medium(s) 114 can enable the entities 112 to initiate one or more transfer operations, such as with respect to transferring resources from one entity to another entity. The resources can include computing resources or system resources, such as processing power, storage, memory, etc. For example, the transfer operations may be initiated as part of resource allocation to distribute computing resources among the entities 112. In some embodiments, the transfer medium management system can be part of a transfer operation system that can process, fulfill, or resolve the transfer operations initiated by the secured transfer medium(s) 114. For example, the transfer operation system can include one or more modules that can receive transfer operation data related to the transfer operations and validate the transfer operations to determine whether to execute the transfer operations. A respective secured transfer medium can be issued, assigned, or otherwise provided to each entity such that the entities 112 can initiate the transfer operations using the secured transfer medium 114. In some embodiments, the secured transfer medium 114 can be a tangible object. In other embodiments, the secured transfer medium(s) 114 can be provided as part of an electronic device or software program, such as a mobile wallet. In some embodiments, each secured transfer medium 114 can include or be associated with a unique identifier (e.g., a numeric identifier). The unique identifier can be linked to a respective entity corresponding to each secured transfer medium. In some cases, the unique identifier can be used to validate transfer operations initiated using the secured transfer medium 114.

In some embodiments, the secured transfer medium 114 can be provided to the entities 112 based on a respective transfer medium request initiated by each entity. Each transfer medium request can include information (e.g., historical resource usage) of a corresponding entity that can be used to determine that the corresponding entity is eligible or otherwise suited to receive the secured transfer medium 114. For example, the transfer medium management system can determine whether a particular entity is sufficiently reliable or trustworthy to receive the secured transfer medium 114. In some embodiments, a transfer medium request may be initiated by the particular entity with respect to obtaining a secured transfer medium 114. Once the particular entity is determined to be eligible for the secured transfer medium 114, the particular entity can provide a portion of its resources, such as to indicate accountability or trustworthiness. The transfer medium management system or another suitable system (e.g., the transfer operation system) may set a resource usage threshold of the particular entity based on the portion of entity resources received from the particular entity. In other words, an amount of resources (e.g., system resources) accessible by the particular entity using the secured transfer medium 114 can be equivalent to a quantity of the entity resources provided by the particular entity. In some embodiments, the transfer medium management system or another suitable system may store the portion of resources received from the particular entity, such as at a secured location. The portion of entity resources may be stored remote from or external to the transfer medium management system.

The flow 100 may continue at block 104, where the transfer medium management system determines to transition an entity of the set of entities 112 from its secured transfer medium 114 to an unsecured transfer medium. In some embodiments, the unsecured transfer medium can correspond to less oversight or restrictions compared to the secured transfer medium 114. Additionally or alternatively, the resource usage threshold associated with an unsecured transfer medium may be determined based on resource storage or resource usage of the entity 112 rather than an amount of entity resources provided by the entity 112. The transfer medium management system can determine to transition the entity to the unsecured transfer medium based on an evaluation of the entity using a set of criteria 118, such as with respect to risk, vulnerabilities, likelihood of loss, security threats, etc. For example, based at least in part on usage history of the secured transfer medium 114, the transfer medium management system may determine that the entity has exhibited suitable resource usage indicating that the entity is unlikely to cause security events or other potentially harmful events. The transfer medium management system can evaluate the entity using a score-based evaluation, a criteria-based evaluation, or a combination thereof.

In some embodiments, the score-based evaluation can be part of the criteria-based evaluation such that at least one criterion of the set of criteria 118 includes the entity 112 having a suitable score to be deemed eligible for the unsecured transfer medium. The transfer medium management system can determine an evaluation indicator 116 based on a combination of a behavior score related to usage of the secured transfer medium 114 and an aggregate evaluation score related to resource usage unrelated to the secured transfer medium 114. For example, the entity may initiate a subset of its transfer operations using the secured transfer medium and a remaining portion of its transfer operations using a separate transfer medium that is not managed by or associated with the transfer medium management system. The behavior score can be determined based on the subset of the transfer operations, while the aggregate evaluation score can be determined based at least in part on the remaining portion of the transfer operations. In some embodiments, the transfer medium management system can determine that the entity is eligible for the transition to the unsecured transfer medium based on the evaluation indicator 116 being below a predefined threshold. The predefined threshold of the evaluation indicator 116 can correspond to an amount of risk or a likelihood of a harmful event occurring. Accordingly, if a quantity or value of the evaluation indicator 116 is below the predefined threshold, the entity can be eligible for the transition due to the evaluation indicator 116 indicating that the entity has historical resource usage that is secure or reliable. The evaluation indicator 116 being below the predefined threshold additionally may indicate that the entity is likely to exhibit secure or reliable behavior at a later time using the unsecured transfer medium.

The flow 100 may continue at block 106, where the transfer medium management system transmits a graduation request to initiate a transition to the unsecured transfer medium from the secured transfer medium 114. In some embodiments, a transfer medium module 120 of the transfer medium management system can generate and transmit the graduation request to an orchestration platform 122. For example, the transfer medium module 120 can use a single application programming interface (API) to communicate with the orchestration platform 122. Based on information included in the graduation request, the orchestration platform 122 can identify the entity and implement the transition to the unsecured transfer medium. For example, the graduation request can include an entity identifier (e.g., a universally unique identifier (UUID)) related to the entity. Additional details related to the transition are described herein with respect to FIG. 2.

The flow 100 may continue at block 108, where the transfer medium management system determines whether the transition to the unsecured transfer medium is successful. In some embodiments, the transfer medium module 120 may attempt to pass the entity identifier in the graduation request via an API call to the orchestration platform 122. If a first attempt to pass the entity identifier via the API call fails, the transfer medium module 120 may attempt the API call another predefined number of times (e.g., three additional API calls). If the first attempt or the additional API call(s) fail, the transfer medium module 120 may generate a failure message indicating that the transition to the unsecured transfer medium was unsuccessful. The failure message may cause one or more remediation actions to be performed, such as to determine a cause of the unsuccessful transition or to implement a manual transition to the unsecured transfer medium. Conversely, if the transfer medium module 120 is able to pass the entity identifier to the orchestration platform, the transfer medium module 120 can generate a success message indicating that the transition to the unsecured transfer medium was successful.

The flow 100 may continue at block 110, where the transfer medium management system performs one or more operations based on determining that the transition to the unsecured transfer medium is successful. In some embodiments, the transfer medium module 120 can be communicatively coupled with one or more entity devices 124 corresponding to the set of entities 112. Based on the transition being successful, the transfer medium module 120 can determine a communication channel by which to inform the entity that the transition was successful. For example, the transfer medium module 120 can identify an email address of the entity using which the transfer medium module 120 can transmit an electronic mail to the particular entity indicating that the transition was successful. In some embodiments, the transfer medium module 120 may modify a dataset related to the entity, such as to link the unsecured transfer medium to the entity or to add a transfer date related to the transition. The dataset can be stored in a database system that can maintain a respective dataset corresponding to each entity of the set of entities 112.

Figure 2:
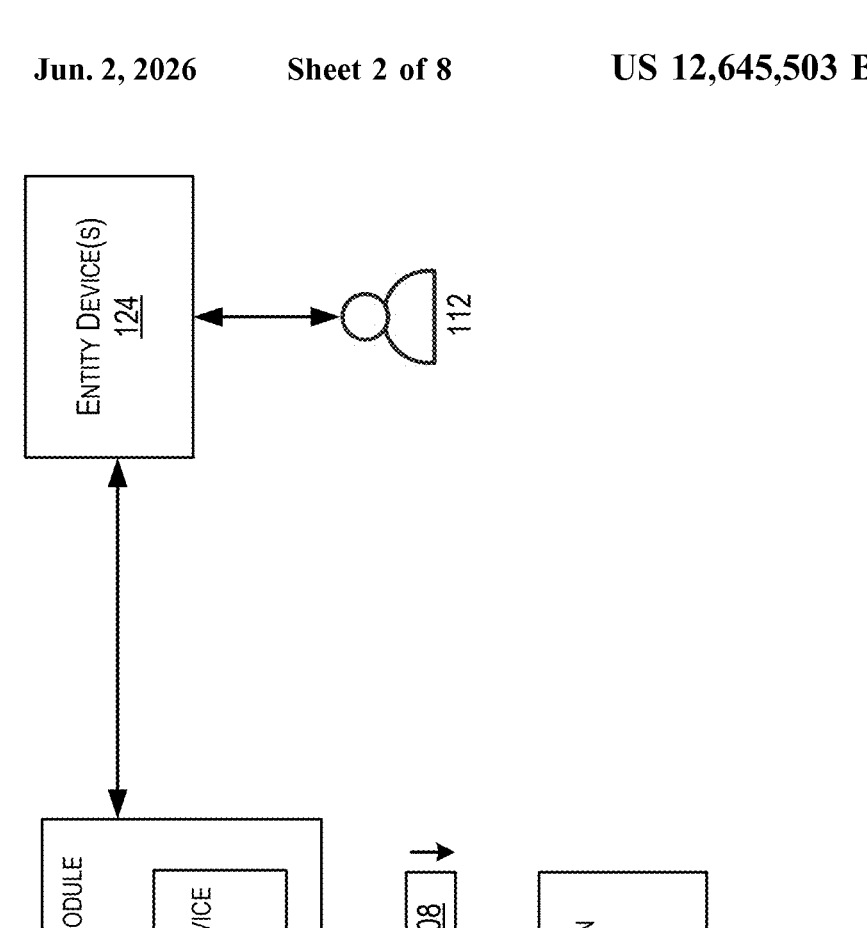
FIG. 2 is a block diagram illustrating an example computing system for transitioning an entity from a secured transfer medium to an unsecured transfer medium, in accordance with at least one embodiment.

FIG. 2 is an example block diagram 200 illustrating an example computing system for transitioning an entity 112 from a secured transfer medium to an unsecured transfer medium, in accordance with at least one embodiment. As described herein, a transition process can be initiated for the entity 112 based on one or more criteria 118 related to the entity 112 being fulfilled. Certain aspects of FIG. 2 are described below with reference to components of FIG. 1. While FIG. 2 depicts a specific arrangement of components, other examples can include more components, fewer components, different components, or a different arrangement of components shown in FIG. 2.

In some embodiments, the transfer medium management system can include an evaluation module 202 that can determine whether to transition the entity 112 that has a secured transfer medium 114 to an unsecured transfer medium. As described herein, the transition process to the unsecured transfer medium may be automatically performed after determining that the entity 112 is eligible for the unsecured transfer medium. In some embodiments, the evaluation module 202 can evaluate each entity on a periodic basis, such as every month, every two weeks, etc. In some embodiments, the evaluation module 202 can execute a query to evaluate each entity of a set of entities 112. Executing the query can involve determine a subset of the entities 112 eligible for the unsecured transfer medium. The query can be performed by the evaluation module 202 as part of a job.

In some embodiments, the evaluation module 202 can determine the subset of eligible entities based on information provided by the orchestration platform 122 or a database system 204. For example, the evaluation module 202 may transmit a retrieval request to the orchestration platform 122 to obtain information related to the secured transfer medium 114 of a particular entity. Based on the information retrieved by the orchestration platform 122 and provided to the evaluation module 202, the evaluation module 202 can determine whether the particular entity is an eligible entity that is eligible for an unsecured transfer medium. In some implementations, the evaluation module 202 can implement a score-based evaluation of the particular entity. For example, the evaluation module 202 can generate an evaluation indicator 116 using the information provided by the orchestration platform 122. The evaluation indicator 116 can correspond to a quantification of risk or trustworthiness of the particular entity. For example, the evaluation indicator 116 may be provided as a numeric score, such as a decimal, percentage, whole number, etc.

In some embodiments, the evaluation module 202 can generate the evaluation indicator 116 based on one or more parameters. At least one parameter used to generate the evaluation indicator 116 can vary (e.g., increase or decrease) over time. For example, the evaluation module 202 can determine the evaluation indicator 116 using an aggregate evaluation score associated with resource usage of the particular entity that is unrelated to the secured transfer medium 114. The aggregate evaluation score can provide a predictive measure of a likelihood of the particular entity failing to provide or return certain resources. The aggregate evaluation score can be determined using activity data or usage data related to the particular entity, other entities (e.g., a group of entities having similar characteristics), or a combination thereof. In some embodiments, the aggregate evaluation score can be unrelated to the particular entity's usage of the secured transfer medium 114. For example, the aggregate evaluation score may account for the particular entity's usage of other transfer mediums, such as with respect to a length of resource usage history, a type of resource usage, resource usage history, risk events, etc. The length of the resource usage history can include an average usage period of each transfer medium associated with the particular entity, a longest usage period of a particular transfer medium, or a combination thereof. As an example, the type of resource usage can include the particular entity providing entity resources in installments or predefined portions over time (e.g., days, weeks, months, years, etc.) in exchange for a particular item or for a particular service. As another example, the type of resource usage can be classified based on the particular entity providing its entity resources on an ongoing basis.

Additionally or alternatively, the evaluation module 202 can generate the evaluation indicator 116 using a behavior score related to the resource usage of the particular entity using the secured transfer medium 114. For example, the evaluation module 202 can obtain information from the orchestration platform 122 related to the particular entity using the secured transfer medium 114 (e.g., information related to one or more transfer operations initiated using the secured transfer medium 114). In particular, the evaluation module 202 can transmit the retrieval request to the orchestration platform to obtain the information related to the particular entity or to the secured transfer medium. Based on the information obtained from the orchestration platform 122, the evaluation module 202 can generate the behavior score of the particular entity. In some embodiments, the evaluation module 202 can use a combination of the aggregate evaluation score and the behavior score to generate the evaluation indicator 116. For example, the evaluation module 202 can use the aggregate evaluation score and the behavior score to generate a matrix score as the evaluation indicator 116. In some examples, if the matrix score exceeds a predefined threshold, the particular entity may be deemed ineligible to receive the unsecured transfer medium. Accordingly, the evaluation module 202 can omit or exclude the particular entity when generating a list of eligible entities for which to initiate the transition process. In other examples, if the matrix score is within an allowable range (e.g., below or equal to the predefined threshold), the evaluation module 202 may include the particular entity as an eligible entity in the list of eligible entities.

In some embodiments, the evaluation module 202 can implement a criteria-based evaluation for the particular entity. For example, the evaluation module 202 can determine whether the particular entity is eligible for the transition process by applying a set of criteria 118. In certain aspects, a criterion applied by the evaluation module 202 can be a prerequisite such that, based on the prerequisite, the evaluation module 202 may proceed with or forgo applying a remainder of the set of criteria 118. For example, if the particular entity has an annual income below a predefined threshold, the particular entity may be ineligible for the transition process. Consequently, the evaluation module 202 may forgo applying additional criteria once the particular entity is determined to have an annual income below the predefined threshold. As another example, a prerequisite can include a minimum tenure of having the secured transfer medium 114. The evaluation module 202 can determine a time period between when the particular entity was provided the secured transfer medium 114 and a current time. If the time period is below a predefined threshold, the evaluation module 202 can determine that the particular entity is ineligible for the unsecured transfer medium. Based on the prerequisite being unfulfilled, the evaluation module 202 can forgo additional assessments of the particular entity. On the other hand, if the prerequisite is fulfilled (e.g., the time period exceeds the predefined threshold), the evaluation module 202 can proceed with applying one or more additional criteria to evaluate the eligibility of the particular entity.

In some embodiments, applying the set of criteria 118 can include determining whether an evaluation variable (e.g., a debt-to-income (DTI) ratio) of the particular entity is below a predefined threshold. As described herein, the particular entity can have a current resource usage threshold with respect to using the secured transfer medium 114. The current resource usage threshold can be equivalent to an amount of entity resources previously provided by the particular entity to receive the secured transfer medium 114. As an example, the current resource usage threshold can be a credit limit corresponding to the secured transfer medium 114. The evaluation module 202 can determine the evaluation variable as a ratio between the current resource usage threshold adjusted with a current debt value and an income value of the particular entity. The current debt value can correspond to an amount of resources owed by the particular entity for a predefined time window, such as a current month. The evaluation module 202 can determine that the particular entity is ineligible for the unsecured transfer medium if the evaluation variable is equal to or exceeds a predefined value. Conversely, if the evaluation variable is below the predefined value, the evaluation module 202 can deem the particular entity is eligible for the unsecured transfer medium.

In some embodiments, the evaluation module 202 can determine an adjusted resource usage threshold such that an evaluation variable of the particular entity is below a predefined threshold. The evaluation module 202 then can compare the adjusted resource usage to the current resource usage threshold related to the secured transfer medium 114. Based on the adjusted resource usage threshold being equal to or higher than the current resource usage threshold, the evaluation module 202 can determine to transition the particular entity to the unsecured transfer medium. In certain aspects, the evaluation module 202 may implement both the score-based evaluation and the criteria-based evaluation to evaluate eligibility of the particular entity. Accordingly, to determine that the particular entity is eligible for the unsecured transfer medium, the evaluation module 202 can verify that the particular entity fulfills each requirement of the score-based evaluation and the criteria-based evaluation.

In some embodiments, once the evaluation module 202 determines that the entity 112 is eligible for the unsecured transfer medium, the evaluation module 202 can provide communication via a messaging service 206 including information related to the eligible entity 112. The communication generated based by the evaluation module 202 can include a file (e.g., a comma-separated values (CSV) file) to provide the information related to the eligible entity. As an example, the messaging service 206 can be a publish-subscribe messaging service that can function as an intermediary between one or more publishers and one or more subscribers. More specifically, the evaluation module 202 can be a publisher that can generate and transmit one or more messages. In some embodiments, a transfer medium module 120 of the transfer medium management system can be a subscriber that can register or subscribe to one or more communication channels of the messaging service 206. In particular, the transfer medium module 120 can subscribe to a particular communication channel through which the evaluation module 202 can provide its communication (e.g., messages) related to the eligible entity.

Although the messaging service 206 is described herein as a publish-subscribe messaging service, it will be appreciated that other types of messaging services are possible. For example, the messaging service 206 can include a message queue that can store one or more messages, such as messages generated by the evaluation module 202. The message queue may temporarily store the messages until the messages are accessed by another component of the transfer medium management system, such as the transfer medium module 120.

Once the transfer medium module 120 receives the communication from the evaluation module 202 via the messaging service 206, the transfer medium module 120 can initiate the transition process to transition the eligible entity to the unsecured transfer medium. In some embodiments, the transfer medium module 120 can initiate the transition process by communicating with the orchestration platform 122. For example, the transfer medium module 120 can transmit a graduation request 208 to the orchestration platform 122 using a single application programming interface (API). The API can be a set of rules or protocols that can enable the transfer medium module 120 to communicate with the orchestration platform 122, such as to exchange data. The graduation request 208 can include information related to the eligible entity 112, such as a unique entity identifier that can be used by the orchestration platform 122 to identify the eligible entity 112. In some embodiments, the entity identifier can be a universally unique identifier (UUID). Other types of identifiers are possible. In some embodiments, the transfer medium module 120 may generate the entity identifier as part of the graduation request 208.

In some embodiments, the transfer medium module 120 can generate communication to indicate that the transition process was successful. The transfer medium module 120 can output the communication for display via a user interface viewable by the eligible entity 112. In some examples, the user interface can be displayed via a mobile device, for example as part of a software application installed on the mobile device. In other examples, the user interface can be displayed as part of a web page or website, which the eligible entity 112 can access using a computing device, such as a desktop computer or laptop. In some embodiments, the transfer medium module 120 can output the communication as a publisher to a particular topic or communication channel of the messaging service 206. A server or another suitable computing component may function as a subscriber to the particular topic or particular communication channel to obtain the communication from the transfer medium module 120. Based on the communication, the server can provide instructions to generate the user interface for display to the eligible entity 112.

In some embodiments, the transfer medium module 120 may be unsuccessful in initiating the transition process. For example, the transfer medium module 120 may fail to communicate with the orchestration platform 122. In some cases, the orchestration platform 122 may be unavailable (e.g., offline), which can cause the orchestration platform 122 to fail to receive the graduation request 208 generated by the transfer medium module 120. In other cases, the orchestration platform 122 can generate an error message based on failing to identify the eligible entity 112. By way of example, the orchestration platform 122 may generate the error message after failing to identify a particular entity corresponding to the entity identifier included in the graduation request 208. In some embodiments, the orchestration platform 122 can transmit the error message to the transfer medium module 120 via the messaging service 206. As an example, the orchestration platform 122 can function as a publisher, while the transfer medium module 120 can subscribe to a particular communication channel or topic of the messaging service 206 by which the orchestration platform 122 can output the error message.

In some embodiments, the transfer medium module 120 can execute multiple processes. For example, a first process executed by the transfer medium module 120 can involve initiating the transition process, while a second process executed by the transfer medium module 120 can involve evaluate one or more transfer errors resulting from unsuccessfully initiating or completing the transition process. In some implementations, the first process of the transfer medium module 120 can provide communication related to the transfer errors to a particular communication channel of the messaging service 206. The second process can obtain information related to the transfer errors from the particular communication channel to then evaluate the transfer errors. In some embodiments, executing the second process can involve determining a remediation action to address or resolve the transfer errors. For example, the remediation action can involve reprocessing or reattempting the transition process. The remediation action may be performed automatically. As another example, the remediation action may involve manual review of the transition process. In some embodiments, the transfer medium module 120 can include a remediation service 210 that can be executed to perform the second process.

In some embodiments, based on successfully initiating the transition process, the orchestration platform 122 can update the database system 204. Updating the database system 204 can be part of the transition process. The database system 204 can include one or more databases that can store entity information related to one or more entities (e.g., the eligible entity 112). The database system 204 can be updated over time, such as periodically (e.g., during a predefined time window, every day, every week, every month, etc.) or each time the transition process is successfully initiated. In some implementations, the evaluation module 202 may determine whether a particular entity is eligible for the transition process to the unsecured transfer medium based on the database system 204. For example, the evaluation module 202 can access the database system 204 to obtain entity information related to the particular entity and analyze the entity information to determine eligibility of the particular entity. In some embodiments, the database(s) of the database system 204 can store the entity information in a tabular format, such as using one or more tables.

In some embodiments, the database system 204 can include at least one database storing information related to transaction mediums. In particular, the transfer medium database(s) can include at least one respective data entry linking each transfer medium managed by the transfer medium management system to a corresponding entity. The transfer medium database(s) can include additional information, such as a type of transfer medium (e.g., secured or unsecured), an issue date (e.g., when a corresponding entity received or was approved for a particular transfer medium), a respective resource usage threshold for each transfer medium, etc. In some implementation, each data entry can link a respective medium identifier (e.g., a numeric identifier) of each transfer medium to the corresponding entity or to a respective entity identifier (e.g., the unique entity identifier described herein). By way of example, a particular data entry in the database system 204 can be generated or updated to link a particular medium identifier of an unsecured transfer medium to a corresponding entity. Each transfer medium can have a unique medium identifier. In some embodiments, the particular data entry can be updated or generated after a successful transition of the eligible entity 112 to the unsecured transfer medium. For example, the transfer medium module 120 can receive a response from the orchestration platform 122 indicating the successful transition of the eligible entity 112. Once the response is received, the transfer medium module 120 can generate the particular data entry in the database system 204.

As another example, the orchestration platform 122 can update a particular database (e.g., a transfer medium database) in the database system 204 to include a new data entry indicating a transfer date on which the transition process is successfully initiated or completed. In some implementations, the new data entry can include a medium identifier of the unsecured transfer medium. The transfer date can correspond to a time or day when the eligible entity 112 receives access to the unsecured transfer medium. In some embodiments, access of the eligible entity 112 to the secured transfer medium 114 may be revoked once the eligible entity 112 is verified to have access to the unsecured transfer medium. For example, a termination process associated with access to the secured transfer medium 114 can be initiated once the eligible entity 112 is provided access to the unsecured transfer medium.

In some embodiments, the transfer medium module 120 can communicate with an entity device 124, such as a mobile device, a laptop, etc. In particular, the transfer medium module 120 can communicate with the entity device 124 to indicate a successful transition of the eligible entity 112 to the unsecured transfer medium. By way of example, the transfer medium module 120 can transmit a message (e.g., electronic mail, text message, pop-up message, etc.) to the entity device 124 indicating the successful transition. Based on the message, the entity 112 can be informed that the transition to the unsecured transfer medium was successful. In some embodiments, the message generated by the transfer medium module 120 may include additional information related to the unsecured transfer medium. For example, the message may include instructions executable by the eligible entity 112 to activate or obtain access to the unsecured transfer medium.

In some implementations, the eligible entity 112 may undergo a verification process prior to obtaining access to the unsecured transfer medium, such as to verify an identity of the eligible entity 112. In some examples in which the unsecured transfer medium is provided as a physical object, the eligible entity 112 can initiate the verification process using the physical object, such as using a numeric identifier included on or with the physical object. Similarly, in some examples in which the unsecured transfer medium is provided virtually, the unsecured transfer medium can include the numeric identifier that can be used to initiate the verification process. As described herein, the numeric identifier of the unsecured transfer medium can be used by the eligible entity 112 to initiate one or more transfer operations.

Figure 3:
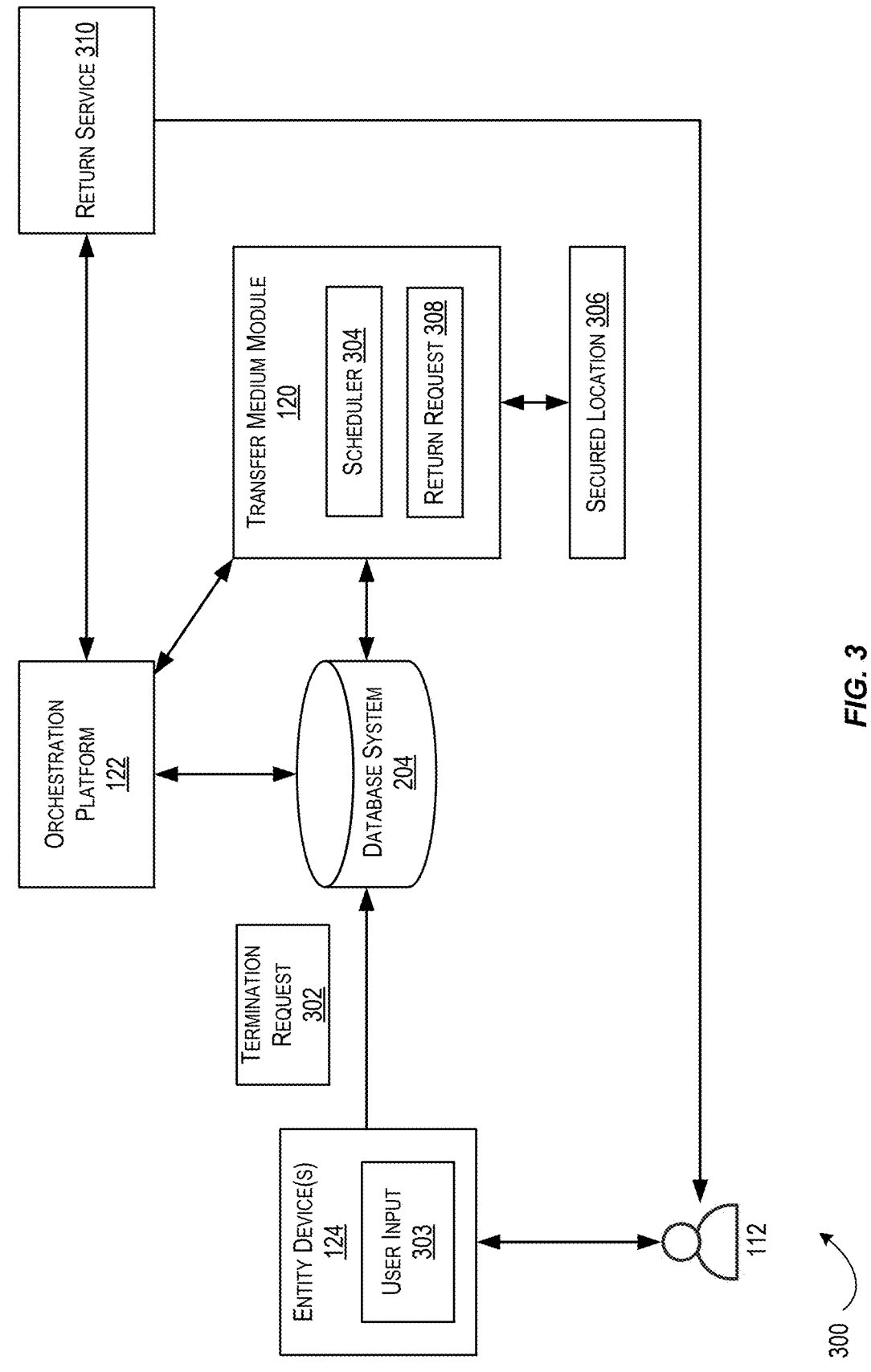
FIG. 3 is a block diagram illustrating an example computing system for implementing a termination process to deactivate a secured transfer medium, in accordance with at least one embodiment.

FIG. 3 is an example block diagram 300 illustrating an example computing system for implementing a termination process to deactivate a secured transfer medium, in accordance with at least one embodiment. In some embodiments, the termination process may be implemented based on an entity 112 being transitioned from the secured transfer medium to an unsecured transfer medium. In other embodiments, the entity 112 may initiate the termination process of the secured transfer medium without having been graduated or transitioned to the unsecured transfer medium. Certain aspects of FIG. 3 are described below with reference to components of FIG. 1 and FIG. 2. While FIG. 3 depicts a specific arrangement of components, other examples can include more components, fewer components, different components, or a different arrangement of components shown in FIG. 3.

In some embodiments, an entity 112 can generate a termination request 302 to initiate the termination process of the secured transfer medium. For example, the entity 112 can provide input (e.g., user input 303) via an entity device 124, such as a mobile device, a laptop, etc. As another example, the entity 112 may go to a physical location to provide the input to generate the termination request 302. Personnel may be available at the physical location to receive the input from the entity 112. Once the personnel receive the input from the entity 112, the personnel can provide the input to a computing device (e.g., a mobile device, laptop, tablet, etc.), such as to generate the termination request 302.

In some implementations, once the termination request 302 is generated, a database system 204 can be updated based on the termination request 302. As described herein, the database system can include one or more databases that can each store information related to the entity 112, transfer mediums, or a combination thereof. The termination request 302 can correspond to or indicate a particular secured transfer medium (e.g., a secured transfer medium 114 of FIG. 1 or 2 described above) to be deactivated. In some embodiments, the transfer medium module 120 can assign or modify a status of the secured transfer medium based on the termination request 302. For example, the transfer medium module 120 can communicate with the database system 204 to assign the closed status to the secured transfer medium based on the termination request 302. In particular, a particular database of the database system 204 can include one or more data entries in a tabular format. Updating the database system 204 can involve modifying a particular data entry corresponding to the status of the secured transfer medium to include the closed status. The status of the secured transfer medium can be updated or assigned as an indicator for the transfer medium module 120 to implement the termination process. Based on the closed status, the transfer medium module 120 can identify which secured transfer medium(s) to deactivate. In some embodiments, the closed status may replace an existing status of the secured transfer medium. For example, the secured transfer medium can initially have a blank status that can indicate that the secured transfer medium is in good standing. Good standing can correspond to the secured transfer medium lacking unresolved system resources that have not been returned by the entity 112.

In some embodiments, the transfer medium module 120 can include a scheduler 304 that can query the database system 204 to identify at least one secured transfer medium 114 to deactivate. The scheduler 304 can identify the secured transfer medium to deactivate based on the secured transfer medium fulfilling a set of criteria. The set of criteria associated with deactivating the secured transfer medium 114 can be different from the set of criteria 118 described above with respect to determining eligibility to transition to the unsecured transfer medium. Having the closed status can be one criterion. For example, the scheduler 304 can communicate with the database system 204 to determine that the secured transfer medium 114 has a particular status (e.g., the closed status). In some embodiments, the set of criteria 118 can include a minimum amount of time having passed after a closure date corresponding to the secured transfer medium. For example, the closure date can correspond to a date or time when the closed status was assigned to the secured transfer medium. Additionally or alternatively, the scheduler 304 can identify the secured transfer medium 114 to deactivate based on a period of time from a transfer date of the secured transfer medium 114. For example, the transfer date can correspond to a time or day at which the entity 112 was transitioned from the secured transfer medium 114 to an unsecured transfer medium. The set of criteria 118 can include a minimum amount of time having passed after the transfer date to enable the secured transfer medium 114 to be deactivated, such as to ensure that transfer operations initiated using the secured transfer medium 114 have been processed.

In some embodiments, once the transfer medium module 120 identifies the secured transfer medium 114 to deactivate, the transfer medium module 120 can determine a secured location 306 at which a portion of entity resources is reserved. As described herein, the reserved entity resources stored or reserved at the secured location 306 may have been provided by the entity 112 to obtain the secured transfer medium 114. In some applications, the reserved entity resources can be referred to as a deposit. In some embodiments, each secured transfer medium can have a respective secured location. The database system 204 can include one or more data entries linking each secured transfer medium to its corresponding secured location. To determine the secured location 306 of the secured transfer medium 114 to deactivate, the transfer medium module 120 can search or query the database system 204 based on the secured transfer medium, such as using a numeric identifier associated with the secured transfer medium. Using the database system 204, the transfer medium module 120 can obtain a location identifier corresponding to the secured location 306. For example, a particular database of the database system 204 may include a mapping to link the numeric identifier of the secured transfer medium with the location identifier of the secured location 306. In some embodiments, the location identifier can be a numeric identifier, such as a sequence of numbers. Other types of identifiers are possible.

In some embodiments, once the transfer medium module 120 determines or identifies the secured location 306, the transfer medium module 120 can quantify the reserved entity resources. For example, the transfer medium module 120 can determine how many units (e.g., a dollar amount) of the reserved entity resources are stored in the secured location 306. In some embodiments, once the transfer medium module 120 identifies the secured transfer medium to deactivate, the transfer medium module 120 can determine a current unresolved amount of resources associated with the secured transfer medium 114. For example, the current unresolved amount of resources can be a positive value. Conversely, the current unresolved amount of resources can be a negative value. As another example, the current unresolved amount of resources can be zero. In certain aspects, the transfer medium module 120 may return an entire amount of the reserved entity resources to the entity 112 as part of the termination process, such as if the current unresolved amount of resources is zero. In other aspects, the transfer medium module 120 can compare the current unresolved amount of resources to the reserved entity resources to determine whether to return at least a subset of the reserved entity resources to the entity 112. For example, if the current unresolved amount of resources is negative, the transfer medium module 120 may withhold a subset of the reserved entity resources that is equivalent to the current unresolved amount of resources in magnitude.

As described herein, the entity 112 can use the secured transfer medium 114 to initiate one or more transfer operations. In some embodiments, the transfer operations can involve the entity 112 providing system resources via the secured transfer medium 114 to receive an object or a service. The system resources provided using the secured transfer medium can contribute to the unresolved amount of resources. At a later time, the entity 112 may provide a portion of its entity resources to replace the system resources exchanged as part of the transfer operations to resolve the unresolved amount of resources. In some embodiments, the portion of entity resources provided by the entity 112 may be less than an amount of system resources used for the transfer operations. Consequently, the unresolved amount of resources may be a remaining amount of system resources. In some cases in which the unresolved amount of resources corresponds to unresolved system resources, the unresolved amount of resources may be represented as a negative value. In other embodiments, the portion of entity resources provided by the entity 112 may exceed the amount of system resources provided for the transfer operations. Consequently, the unresolved amount of resources may be a remaining amount of entity resources. In such cases, the unresolved amount of resources may be represented as a positive value. In certain aspects in which the portion of entity resources provided is equivalent to the amount of system resources used, the unresolved amount of resources may be zero.

In some embodiments, the transfer medium module 120 may communicate with the orchestration platform 122 to proceed with the termination process. The transfer medium module 120 can transmit different return requests to the orchestration platform 122 based on the current unresolved amount of resources, such as whether the current unresolved amount of resources is zero, positive, or negative. For example, the transfer medium module 120 can generate and transmit a first type of a return request 308 to the orchestration platform 122 based on the current unresolved amount of resources having a positive value. The return request 308 of the first type can indicate the current unresolved amount of resources. Additionally, the return request 308 of the first type can indicate the quantification of the reserved entity resources. Once the orchestration platform 122 receives the return request 308 of the first type, the orchestration platform 122 can communication with a return service 310 to return the reserved entity resources and the current unresolved amount of resources to the entity 112. In some embodiments, the return service 310 can generate a physical document that the entity 112 can use to obtain the reserved entity resources and the current unresolved amount of resources.

As another example, based on the current unresolved amount of resources being zero, the transfer medium module 120 may transmit a return request 308 of a second type to the orchestration platform 122. The return request 308 of the second type can provide instructions to the orchestration platform 122 to return a full amount of the reserved entity resources to the entity 112. Based on the return request 308 of the second type, the orchestration platform 122 can communicate with the return service 310 to return the reserved entity resources to the entity 112. As an example, once the return service 310 receives the communication from the orchestration platform 122, the return service 310 can generate and transmit a physical document by which the entity 112 can obtain the reserved entity resources.

As a further example, based on the current unresolved amount of resources being negative, the transfer medium module 120 may compare the current unresolved amount of resources to the reserved entity resources. In some examples, a magnitude of the current unresolved amount of resources can be less than that of the reserved entity resources. In other words, subtracting the magnitude of the current unresolved amount of resources from the reserved entity resources can result in a positive value. Accordingly, the transfer medium module 120 can transmit a return request 308 of a third type to the orchestration platform 122 such that the orchestration platform 122 can provide instructions to the return service 310 to initiate or complete a return process. In particular, the orchestration platform 122 can instruct the return service 310 to return a remaining amount of the reserved entity resources after subtracting the magnitude of the current unresolved amount of resources. In other words, the entity 112 can receive from the return service 310 an amount of entity resources equivalent to a difference between the reserved entity resources and the current unresolved amount of resources.

In other examples, the magnitude of the current unresolved amount of resources can be equal to or greater than that of the reserved entity resources, resulting in zero or a negative value, respectively, when comparing the two quantities. Accordingly, the transfer medium module 120 may forgo transmitting the return request 308 to the orchestration platform 122. In some implementations, the transfer medium module 120 may output communication to the entity 112 to indicate that entity resources will not be returned, such as based on the difference between the current unresolved amount of resources and the reserved entity resources being zero. Additionally or alternatively, the communication provided by the transfer medium module 120 can request that the entity 112 provides additional entity resources equivalent to the negative value.

In some embodiments, each type of the return request 308 can include a respective indicator (e.g., a sequence of alphanumeric characters) indicating the respective type. The orchestration platform 122 can use the respective indicators to determine instructions to provide to the return service 310, such as a quantity of the entity resources to return to the entity 112. As described herein, the returned entity resources can include the reserved entity resources, an unresolved amount of entity resources, or a combination thereof.

In some embodiments, the transfer medium module 120 can transmit a closure request to close or terminate the secured location 306. In particular, the closure request can be transmitted to modify a status of the secured location to a closed status. The secured location 306 can be deactivated in response to the closed status being assigned. As an example, the transfer medium module 120 may transmit the closure request once the return request 308 has been received by the orchestration platform 122. The orchestration platform 122 may transmit a response to the transfer medium module 120 to indicate receipt of the return request

308 or to indicate that the return request 308 has been resolved, such as once the return service 310 has initiated the return process.

Figure 4:
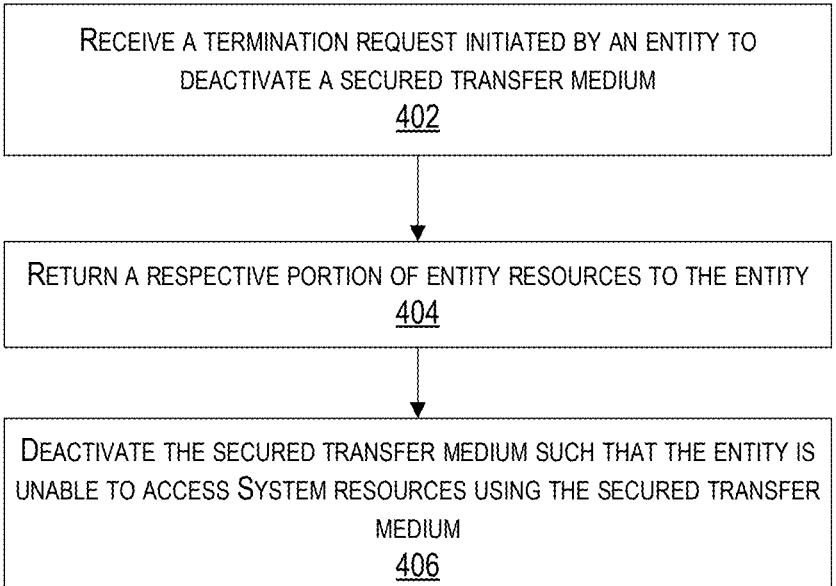
FIG. 4 is a block diagram illustrating an example method for deactivating a secured transfer medium of an entity, in accordance with at least one embodiment.

FIG. 4 is a block diagram illustrating an example method 400 for deactivating a secured transfer medium 114, in accordance with at least one embodiment. A non-transitory computer-readable storage medium may store computer-executable instructions that, when executed by at least one processor, cause at least one computer to perform instructions comprising the operations of the method 400. It should be appreciated that the operations of the method 400 may be performed in any suitable order, not necessarily the order depicted in FIG. 4. Further, the method 400 may include additional, or fewer operations than those depicted in FIG. 4. The operations of method 400 may be performed by any suitable portion of the transfer medium management system described herein. In some embodiments, method 400 may be executed by components of the transfer medium management system 600 of FIG. 6. Certain aspects of FIG. 4 are described below with reference to components of FIGS. 1-3.

The method 400 may begin at block 402, where the transfer medium management system may receive a termination request 302 to deactivate a secured transfer medium 114. For example, a transfer medium module 120 of the transfer medium management system can receive the termination request 302 initiated by an entity 112 to deactivate the secured transfer medium 114. As another example, the termination request 302 may be generated internally by a component of the transfer medium management system, such as after a successful transition of the entity 112 from the secured transfer medium 114 to an unsecured transfer medium. As part of deduplication or to avoid redundancy, the transfer medium management system can initiate the termination request 302 internally to deactivate the secured transfer medium 114 once the entity 112 is transitioned to the unsecured transfer medium. In some implementations, deactivating the secured transfer medium 114 can be part of a transition process to transition the entity 112 to the unsecured transfer medium.

At block 404, a respective portion of entity resources can be returned to the entity 112. In some embodiments, the entity 112 may provide a portion of its resources as part of obtaining the secured transfer medium 114. For example, the entity 112 can provide the portion of entity resources to the transfer medium management system as part of a verification process to obtain the secured transfer medium 114. The portion of the entity resources can be used to validate resource access or resource availability of the entity 112. As described herein, a resource consumption threshold of the secured transfer medium 114 can be equivalent to or determined based on a quantity of the entity resources provided by the entity 112. Once the transfer medium management system receives the portion of the entity resources, the transfer medium management system can reserve the portion of the entity resources. For example, the transfer medium management system can provide the reserved entity resources to a secured location 306 for storage. The secured location 306 can be closed or deleted once the reserved entity resources are removed from the secured location 306, such as to return the reserved entity resources to the entity 112. As described herein, the transfer medium module 120 of the transfer medium management system can transmit a return request 308 to an orchestration platform 122 of the transfer medium management system. In response to receiving the return request 308, the orchestration platform 122 can communicate with a return service 310 to return at least a subset of the reserved entity resources.

At block 406, the secured transfer medium 114 can be deactivated such that the entity 112 is unable to access system resources using the secured transfer medium 114. As described herein, the system resources can include computing resources, such as memory, storage, processing power, etc. Other types of system resources are possible, such as credit or loans. In general, the system resources can enable the entity 112 to perform one or more transfer operations. Deactivating the secured transfer medium 114 can include closing or terminating a secured location 306 storing the reserved entity resources provided by the entity 112. Once the secured transfer medium 114 is deactivated, the entity 112 can be unauthorized to access the system resources using the secured transfer medium 114.

FIG. 5 is a block diagram illustrating an example method 500 for providing an unsecured transfer medium or a secured transfer medium 114 to an entity 112, in accordance with at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion of the transfer medium management system described herein. In some embodiments, method 500 may be executed by components of the transfer medium management system 600 of FIG. 6. Certain aspects of FIG. 5 are described below with reference to components of FIGS. 1 and 3.

The method 500 may begin at 502, where a transfer medium request can be received by the transfer medium management system. In some embodiments, the transfer medium request can be initiated by an entity 112 with respect to obtaining the unsecured transfer medium. The method 500 can proceed to block 504 if the transfer medium request is initiated to obtain the unsecured transfer medium. In other embodiments, the entity 112 may initiate the transfer medium request to obtain the secured transfer medium 114. The entity 112 may interact with a user interface outputted by a component of the transfer medium management system to obtain suitable information from the entity 112 to determine whether the entity 112 is eligible for the unsecured transfer medium or for the secured transfer medium 114. By way of example, the transfer medium management system may receive the transfer medium request after the entity 112 submits user input via an entity device 124, such as text input in one or more input fields of a form.

At block 504, the entity 112 can be determined to be eligible or ineligible for the unsecured transfer medium. For example, the transfer medium management system can have a transfer medium evaluation module (not pictured) that can evaluate one or more parameters of the entity 112 to determine whether the entity 112 is eligible for the unsecured transfer medium. In some embodiments, the entity 112 can be evaluated based on a risk assessment to determine whether the entity 112 is eligible for the unsecured transfer medium. For example, a score-based evaluation of the entity 112 can involve obtaining an aggregate evaluation score of the entity 112, such as from an external provider, that can indicate or correspond to a predicted level of risk associated with the entity 112. The transfer medium evaluation module can use at least the aggregate evaluation score to determine whether to allow the entity 112 to receive the unsecured transfer medium. Other parameters of the entity 112 evaluated by the transfer medium evaluation module can include an amount of entity resources attributed to the entity 112, an amount of entity resources received by the entity 112 at periodic intervals, historical usage of entity resources, etc. Based on eligibility of the entity 112, the method 500 may proceed to block 506 or block 508. For example, if the transfer medium evaluation module determines that the entity 112 is eligible for the unsecured transfer medium, the method 500 can proceed to block 506. Conversely, if the entity 112 is ineligible for the unsecured transfer medium, the method 500 can proceed to block 508. The particular entity can be determined to be ineligible for the unsecured transfer medium at the time of initiating the transfer medium request. In some embodiments, the transfer medium management system may determine that the particular entity is ineligible for the unsecured transfer medium but is eligible for the secured transfer medium 114.

At block 506, based on the entity 112 being eligible for the unsecured transfer medium, the entity 112 can be provided the unsecured transfer medium. In some embodiments, the unsecured transfer medium may be provided to the entity 112 as a tangible object, such as a plastic card. For example, the tangible object can be mailed or otherwise transmitted to the entity 112. Additionally or alternatively, the unsecured transfer medium can be provided to the entity 112 as a virtual object, such as part of a software application that can be installed on an entity device 124. As a non-limiting example, the virtual object can represent the unsecured transfer medium in a mobile wallet application installed on a mobile device.

At block 508, based on the entity 112 being ineligible for the unsecured transfer medium, the entity 112 can be determined to be eligible for the secured transfer medium 114. In particular, after being determined to be ineligible for the unsecured transfer medium, the entity 112 can be automatically evaluated with respect to eligibility to obtain the secured transfer medium 114. In some embodiments, eligibility for the secured transfer medium 114 may be less stringent compared to the unsecured transfer medium. In particular, eligibility for the secured transfer medium 114 can correspond to a lower threshold compared to eligibility for the unsecured transfer medium. For example, eligibility for the unsecured transfer medium may require an aggregate evaluation score above a first threshold, whereas eligibility for the secured transfer medium 114 may correspond to a second threshold below the first threshold. As another example, if the entity 112 has a network bandwidth of 50 Mbps, the entity 112 may be ineligible for an unsecured transfer medium that has an eligibility threshold of 100 Mbps. Conversely, the entity 112 can be eligible for a secured transfer medium 114 corresponding to an eligibility threshold of 30 Mbps.

In some embodiments, in response to determining that the entity 112 is eligible for the secured transfer medium, a notification can be outputted to the entity 112, such as via the entity device 124, to request user input 303 from the entity 112. For example, the notification can request that the entity 112 select whether to proceed with obtaining the secured transfer medium 114. Accordingly, the entity 112 can indicate via the user input whether to proceed with obtaining the secured transfer medium 114 instead of the unsecured transfer medium.

Figure 6:
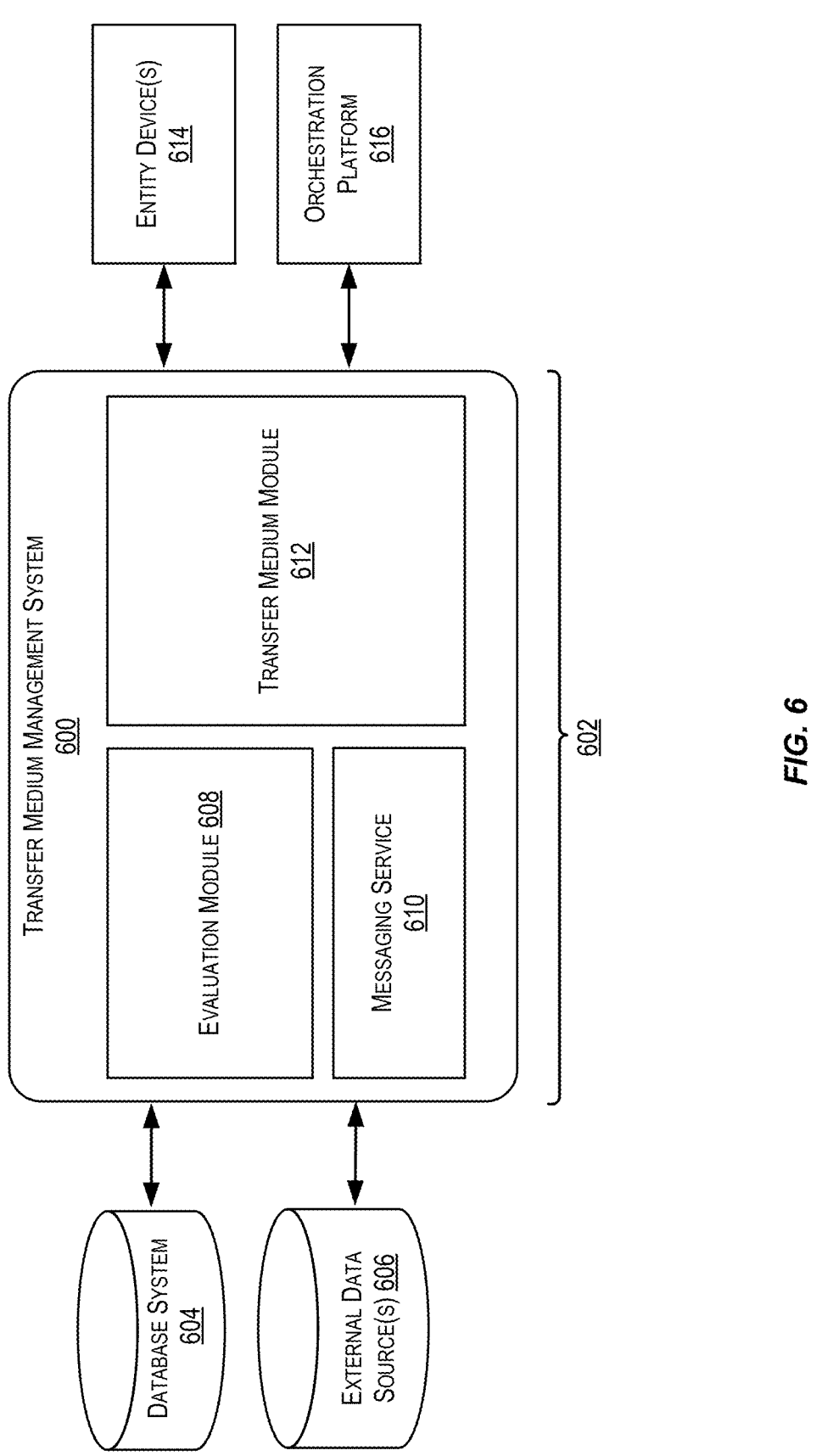
FIG. 6 is a schematic diagram of an example computer architecture for a transfer medium management system, including one or more modules that may perform one or more functions in accordance with at least one embodiment.

FIG. 6 is a schematic diagram of an example computer architecture for the transfer medium management system 600, including a plurality of modules 602 that may perform functions in accordance with at least one embodiment described herein. The transfer medium management system 600 can be configured to support the processes, methods, operations, and techniques described herein, such as with respect to FIGS. 1-5 and FIG. 7. The modules 602 may be software modules, hardware modules, or a combination thereof. If the modules 602 are software modules, the modules 602 can be embodied on a computer readable medium and processed by a processor or a processing device in any of the computer systems described herein. It should be noted that any module or data store described herein, may be, in some embodiments, be a service responsible for providing functionality corresponding to the module described below. The modules 602 may be executed as part of the transfer medium management system 600, or the modules 602 may exist as separate modules or services external to the transfer medium management system 600 (e.g., hosted on external servers). In some embodiments, the modules 602 may be executed by the same or different computing devices, as a service, as an application, or the like.

In the embodiment shown in the FIG. 6, data stores such as a database system 604 and one or more external data sources 606 are shown, although data can be maintained, derived, or otherwise accessed from various data stores, either remote or local to the transfer medium management system 600, to achieve the functions described herein. The transfer medium management system 600, as shown in FIG. 6, includes various modules such as an evaluation module 608, a messaging service 610, and a transfer medium module 612. Some functions of the modules 608-612 are described herein. Additionally, a brief, non-limiting description of each of the modules is provided in the following paragraphs. In accordance with at least one embodiment, a process for transitioning an entity from a secured transfer medium to an unsecured transfer medium and/or for terminating the secured transfer medium is provided.

The database system 604 can include one or more databases that can store any suitable data related to one or more transfer mediums, according to some embodiments. For example, one or more mappings can be maintained that can link the transfer mediums to a respective entity. As another example, the database system 604 can store data related to one or more attributes associated with the transfer mediums, such as a respective type of each transfer medium, a respective transfer date associated with certain unsecured transfer mediums, etc. In some embodiments, the database system 604 can store its data in a structured format, such as in a tabular format.

The external data sources 606 can include one or more external databases or external entities that can provide information related to entities associated with the transfer mediums overseen by the transfer medium management system 600. Examples of the external data sources 606 can include credit bureaus, government entities, etc. In some embodiments, the external data sources 606 can provide a respective aggregate evaluation score associated with resource usage by the entities. Additionally or alternatively, the external data sources 606 can provide data related to resource usage that is unrelated to the transfer mediums overseen by the transfer medium management system 600. By way of example, the data provided by the external data sources 606 can be with respect to housing of the entities or external transfer mediums used by the entities to initiate transfer operations.

In at least one embodiment, the transfer medium management system 600 includes the evaluation module 608 that can include or execute any suitable instructions to evaluate whether the entities are eligible for a transition to an unsecured transfer medium. Generally, the evaluation module 608 may be utilized to analyze or process any suitable information with respect to any example provided herein. By way of example, the evaluation module 608 may be configured to obtain information or data from the database system 604 to evaluate whether certain entities are eligible for the transition from a secured transfer medium to an unsecured transfer medium. In some embodiments, the evaluation module 608 can communicate with the database system 604, such as using retrieval requests, to obtain the information from the database system 604. Different analysis techniques can be implemented by the evaluation module 608 to execute an evaluation process to determine the eligibility of the entities. For example, as described herein, the evaluation module 608 can apply a score-based evaluation, a criteria-based evaluation, or a combination thereof to determine whether certain entities are eligible for the unsecured transfer medium. In some embodiments, the evaluation module 608 can use artificial intelligence or machine learning techniques to perform the evaluation process. Additionally or alternatively, the evaluation module 608 may perform the evaluation process using other automated techniques, such as by applying one or more rule sets.

In at least one embodiment, the transfer medium management system 600 includes the messaging service 610. The messaging service 610 can enable communication among components of the transfer medium management system 600 and communication with components of external systems. In some embodiments, the messaging service 610 can be a publish-subscribe messaging service that can include one or more communication channels via which one or more components (e.g., publishers) of the transfer medium management system 600 can provide communication. Other components (e.g., subscribers) of the transfer medium management system 600 can subscribe to at least one communication channel to receive the communication from the publishers. Certain components may be both publishers and subscribers, such as functioning as a publisher for a first communication channel and as a subscriber for a second communication channel. The publish-subscribe messaging service can implement asynchronous communication among the components of the transfer medium management system 600. In some examples, the communication channels of the messaging service 610 can be referred to as topics.

In at least one embodiment, the transfer medium management system 600 includes the transfer medium module 612. The transfer medium module 612 can receive and transmit requests to facilitate one or more processes executed by the transfer medium management system 600. In some embodiments, the transfer medium module 612 can receive communication from the evaluation module 608 to initiate a transition process for eligible entities selected by the evaluation module 608. By way of example, the transfer medium module 612 can receive a file from the evaluation module 608 that indicates the eligible entities. Based on the file, the transfer medium module 612 can communication with other components in the transfer medium management system 600 or external systems to initiate or perform one or more steps of the transition process. For example, the transition process can include transitioning a particular entity from the secured transfer medium to the unsecured transfer medium. Additionally, the transition process can include generating an account associated with the unsecured transfer medium and linking the account to the particular entity. Further, the transition process can include communicating the transition to the particular entity, such as when the transition process is successfully completed and the particular entity can access the unsecured transfer medium.

In some embodiments, the transfer medium management system 600 can communicate with one or more modules, services, applications, devices, etc. As shown in FIG. 6, the transfer medium management system 600 can be communicatively coupled with one or more entity devices 614. As described herein, the transfer medium module 612 may communicate with the particular entity once the transition process is successfully completed. For example, the transfer medium module 612 can execute one or more process to generate electronic mail, such as using a template, and transit the electronic mail to an entity device 614 corresponding to the particular entity. As another example, the transfer medium module 612 can transmit a notification to the entity device 614 to indicate that a transition to the unsecured transfer medium is upcoming or likely in the near future (e.g., within a week, a month, etc.). In some embodiments, the communication between the transfer medium management system 600 and the entity device 614 can be transmitted via a network, such as the Internet.

In some embodiments, the transfer medium management system 600 can be communicatively coupled with an orchestration platform 616. The orchestration platform 616 can be part of an external system, such as a computing system that is separate from the transfer medium management system 600. The orchestration platform 616 can receive one or more requests from the transfer medium management system 600, such as from the transfer medium module 612. Based on the requests, the orchestration platform 616 can execute one or more process to complete one or more steps of the transition process. By way of example, the orchestration platform 616 can generate one or more updates to the database system 604 and transmit the updates to the transfer medium management system 600 to be implemented in batches to update the database system 604.

FIG. 7 is a block diagram illustrating an example method 700 for implementing a graduation process to transition one or more entities 112 from a secured transfer medium 114 to an unsecured transfer medium, in accordance with at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 700 may include additional, or fewer operations than those depicted in FIG. 7. The operations of method 700 may be performed by any suitable portion of the transfer medium management system 600 of FIG. 6 which may include one or more computing devices such as computing device 800 of FIG. 8. Certain aspects of FIG. 7 are described below with references to components of other figures, such as FIGS. 1, 2, and 6.

The method 700 may begin at 702, where a set of entities 112 can be identified as having a respective secured transfer medium 114 assigned after each entity provided a respective portion of entity resources to be reserved. In some examples, an evaluation module 202 of the transfer medium management system 600 can request transfer medium data from a database system 204 of the transfer medium management system 600. The transfer medium data can include information related to each transfer medium (e.g., secured or unsecured transfer mediums) managed by the transfer medium management system 600. The evaluation module 202 can use the transfer medium data to determine which transfer mediums are secured transfer mediums and identify the entities 112 corresponding to the secured transfer mediums 114. As described herein, the reserved entity resources provided by the entities 112 to obtain a respective secured transfer medium can be used to determine a resource usage threshold to limit an amount of system resources that the entities 112 can access using the secured transfer medium 114. As an example, the resource usage threshold can be a credit line.

At block 704, the entities 112 can be evaluated to determine whether to transition at least one of the entities 112 from the secured transfer medium 114 to the unsecured transfer medium. The evaluation module 202 can perform an evaluation process to evaluate eligibility of the entities 112. In some embodiments, the entities 112 can be evaluated based on an evaluation indicator 116 and a set of criteria 118. The evaluation indicator 116 can correspond to a score-based evaluation of the entities 112. For example, the evaluation indicator 116 can be generated by combining one or more scores related to resource usage of the entities 112. As described herein, the evaluation indicator 116 can correspond to a combination of an aggregate evaluation score unrelated to resource usage via the secured transfer medium 114 and a behavior score related to the resource usage via the secured transfer medium 114. Each entity can be assigned a respective evaluation indicator that can vary based on each individual aggregate evaluation score or behavior score.

In some embodiments, the set of criteria 118 can be used to evaluate the entities 112 with respect to a respective tenure of having and using the secured transfer medium 114. For example, the set of criteria 118 may include a minimum amount of time that the entities 112 have had or received the secured transfer medium 114. As another example, the set of criteria 118 can include a minimum timeframe within which the entities 112 have used the secured transfer medium 114 to initiate or resolve one or more transfer operations. Initiating the transfer operations can involve the entities 112 using the secured transfer medium 114 to access and provide system resources to obtain an object or a service. Resolving the transfer operations can involve the entities 112 providing an amount of entity resources equivalent to an amount of system resources used to initiate the transfer operations.

In some embodiments, the evaluation module 202 can use the set of criteria 118 to evaluate the entities 112 with respect to unresolved or outstanding resource usage associated with the transfer medium management system or other systems. For example, a particular criterion of the set of criteria 118 can involve determining that the secured transfer medium 114 is active (e.g., having an active status or an open status). In some examples, if the secured transfer medium 114 is associated with unresolved resource usage that remains unresolved past a predefined time window, the secured transfer medium 114 may be assigned a delinquent status. In some examples, the unresolved resource usage can occur with respect to using the secured transfer medium 114. Additionally or alternatively, the unresolved resource usage can be associated with usage of one or more other transfer mediums that may or may not be managed by the transfer medium management system 600. For example, another transfer medium can be managed by an external provider unrelated to the transfer medium management system 600. The set of criteria 118 can involve determining whether the secured transfer medium 114 is in good standing, such as based on the status of the secured transfer medium 114. The delinquent status can indicate that the secured transfer medium 114 is not in good standing. Additionally, the set of criteria 118 can involve verifying whether the secured transfer medium 114 has been assigned the delinquent status in a predefined historical time window (e.g., in the past six months, past year, etc.). A particular criterion may indicate that any entity having a secured transfer medium 114 assigned the delinquent status within the predefined historical time window is ineligible for the unsecured transfer medium In some embodiments, the evaluation module 202 can use the set of criteria 118 to evaluate the entities 112 with respect to a respective amount of entity resources received by the entities 112. For example, the entities 112 may each receive a predefined amount of entity resources on a periodic basis, such as every two weeks, every month, every year, etc. The respective amount of entity resources received by the entities 112 can affect a likelihood or an ability of the entities 112 to provide sufficient entity resources to address unresolved usages of system resources initiated using the secured transfer medium 114. In some implementations, the set of criteria 118 can include evaluating whether the entities 112 have a minimum amount of entity resources received within a predefined time window (e.g., each month, each year, etc.). Additionally or alternatively, the set of criteria 118 can include determining a respective ratio of each entity calculated by dividing a total amount of unresolved system resources for each entity by the respective amount of entity resources received by each entity. As a non-limiting example, the ratio can be calculated by dividing total monthly debt payments by a gross monthly income.

At block 706, based on determining to transition a particular entity to the unsecured transfer medium, a graduation request 208 can be transmitted to initiate a transition to the unsecured transfer medium. In some embodiments, the transfer medium module 120 of the transfer medium management system 600 can generate and transmit the graduation request 208 to an orchestration platform 122. As an example, the orchestration platform 122 can be an external service, application, or module communicatively coupled with the transfer medium management system 600. The graduation request 208 can include an entity identifier corresponding to the particular entity. The orchestration platform 122 can use the entity identifier to identify the particular entity and initiate the transition to the unsecured transfer medium. In some embodiments, the transition can include the orchestration platform 122 updating a database system 204 to indicate that the particular entity has transitioned from the secured transfer medium 114 to the unsecured transfer medium. Additionally, the transition can include providing the unsecured transfer medium to the particular entity, such as by transmitting a physical object as the unsecured transfer medium to the particular entity. Once the transition is successfully completed, the secured transfer medium 114 of the particular entity can be terminated.

At block 708, based on determining to forgo transitioning the particular entity to the unsecured transfer medium, the particular entity can be re-evaluated at a later time. In some implementations, evaluating the set of entities 112 to determine one or more eligible entities can occur periodically, such as every 15 days, every month, every three months, etc. In some embodiments, the particular entity can be re-evaluated using an updated evaluation indicator and the set of criteria 118. For example, one or more evaluation factors used to generate the evaluation indicator 116 may fluctuate or vary over time, such as from month to month. By way of example, the particular entity's usage of the secured transfer medium may be lower in May than in June. The increased usage in June may cause the updated evaluation indicator to increase or decrease, thereby possibly resulting in the particular entity being eligible for the unsecured transfer medium in June when the particular entity was previously ineligible in May.

Figure 8:
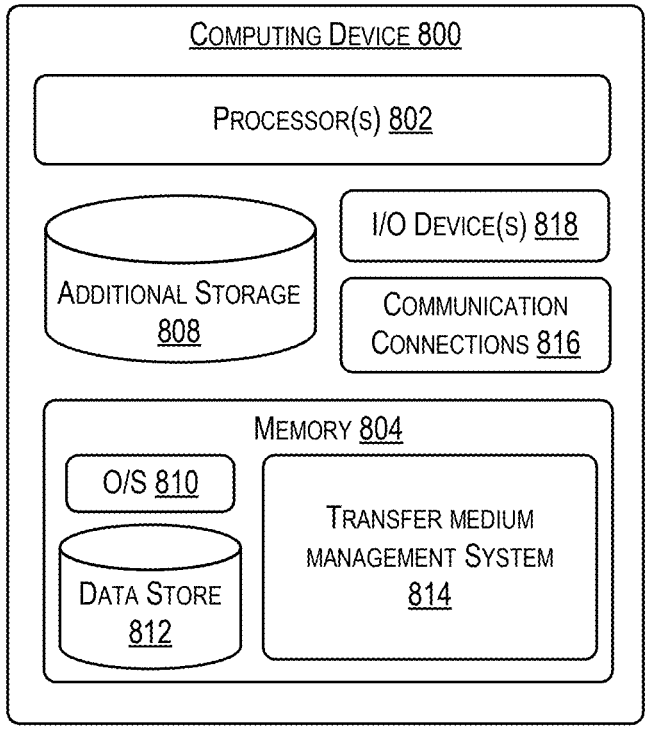
FIG. 8 illustrates an example computing device that may implement the methods disclosed herein.

FIG. 8 illustrates an example computing device 800 that may implement the methods disclosed herein. In some embodiments, the computing device 800 may include one or more processors (e.g., processor(s) 802). The processor(s) 802 may be implemented in hardware, computer-executable instructions, firmware, or combinations thereof. Computer-executable instruction or firmware implementations of the processor(s) 802 may include computer-executable or machine-executable instructions written in any suitable programming language.

Computing device 800 may include memory 804. The memory 804 may store computer-executable instructions that are loadable and executable by the processor(s) 802, as well as data generated during the execution of these programs. The memory 804 may be volatile (such as RAM) and/or non-volatile (such as ROM, flash memory, etc.). The computing device 800 may include additional storage 806, which may include removable storage and/or non-removable storage. The additional storage 806 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 804 or additional storage 806 may individually, or collectively, include multiple different types of memory, such as SRAM, DRAM, or ROM.

The memory 804 and/or additional storage 808 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 804 and the additional storage 808 are examples of computer storage media. Memory 804 and/or additional storage 808 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 800. Combinations of any of the above should also be included within the scope of computer-readable media. Computer-readable media may include computer-readable instructions, program modules, or other data transmitted within a data signal, such as a carrier wave, or other transmission. However, as used herein, computer-readable storage media does not include computer-readable communication media.

The memory 804 may include an operating system 810 and one or more data stores 812, and/or one or more application programs, modules, or services for implementing the features disclosed herein, such as the features provided by the transfer medium management system 814 (an example of the transfer medium management system 600 of FIG. 6).

The computing device may also contain communications connection(s) 816 that allow the computing device 800 to communicate with a stored database, another computing device, a server, user terminals and/or other devices (e.g., via one or more networks, not depicted). The computing device may also include I/O device(s) 818, such as a keyboard, a mouse, a pen, a voice input device, a touch input device, a display, speakers, a printer, etc.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

As a non-limiting example, the transfer medium management system described herein (e.g., the transfer medium management system 600 of FIG. 6) can be used in financial applications. As described herein, the transfer medium management system can evaluate one or more entities to determine whether certain entities with a secured transfer medium are eligible for an unsecured transfer medium. The transfer medium management system can evaluate the entities using one or more criteria. For example, the transfer medium management system can determine whether a particular entity has had a secured transfer medium associated with a particular financial system for a minimum amount of time, such as at least a predefined number of weeks, months, or years. The transfer medium management system can also determine whether an account associated with the secured transfer medium is currently open and in good standing. In some implementations, the transfer medium management system can evaluate the particular entity based on whether the particular entity has usage activity (e.g., transactions initiated or payments made) associated with the secured transfer medium for a minimum length of time. The transfer medium management system additionally can evaluate whether there have been any risk events (e.g., delinquencies, derogatory activity, etc.) associated with the particular entity with respect to internal services, such as the secured transfer medium. The internal services can relate to other transfer mediums that the particular entity may have obtained with the same financial system as the secured transfer medium. In some examples, the transfer medium management system can evaluate for an occurrence of risk events in general with respect to the particular entity in a historical time window, such as within the last four weeks, the last six months, the past year, etc.

An evaluation module of the transfer medium management system can obtain transfer medium information from a database system of the transfer medium management system to evaluate the entities based on the criteria. In particular, the transfer medium information can include a current status, Fair Isaac Corporation (FICO) score, current credit limit, behavior score, or tenure (e.g., recorded length of time associated with an account) related to each transfer medium. Additionally or alternatively, the evaluation module can obtain transaction information, such as purchases, payments, and/or reverse payments. A number of reverse payments can be subtracted from a number of payments in a same time period to determine a total number of valid payments in the time period. The purchases and the valid payments can be grouped together to determine whether the particular entity has had sufficient usage activity for the minimum length of time.

In some implementations, the transfer medium management system can obtain income or housing data associated with the entities to use when evaluating whether to graduate the entities to the unsecured transfer medium. For example, the transfer medium management system can obtain information related to an amount of income, living situation, or housing expenses from a respective transfer medium request submitted by each entity. The transfer medium request can be submitted to request the secured transfer medium. In some embodiments, certain entities may submit the transfer medium request more than once. Subsequent submissions of the transfer medium request can include new or updated information. For example, a particular entity can submit a first transfer medium request in June 2023 and submit a second transfer medium request in April 2024. The particular entity may have a higher aggregate evaluation score and income in April 2024 compared to June 2023, which can result in a higher likelihood of obtaining the secured transfer medium. In some embodiments, duplicated income or housing data is possible, such as due to multiple submissions of the transfer medium request by a specific entity. Duplicated data can be removed based on income. For example, data corresponding to the lowest income for the specific entity can be maintained in the database system, such as by linking the data to a unique identifier corresponding to the specific entity. As another example, if the lowest income is zero, the second lowest income for the specific entity can be maintained in the database system. In some embodiments, the income data or the housing data is valid for a predefined time window, such as one year. Once the predefined time window is exceeded, the income data or the housing data can be considered invalid and omitted from consideration by the evaluation module.

In some embodiments, the transfer medium management system can obtain external entity data from one or more external systems (e.g., credit bureaus). The evaluation module can use the external entity data to determine whether the entities are associated with delinquencies or derogatory events, such as defaulting on a loan. At least a portion of the external entity data can be joined with or added to the database system. When adding the external entity data to the database system, a subset of the entities can be marked with a flag or another suitable indicator generated to indicate that the subset of the entities is associated with a delinquency or a derogatory event. Additionally, the external entity data can provide information related to debt obligations of the entities, such as a type of debt or an amount of monthly debt. The transfer medium management system can process the external entity data to remove duplicates, such as by maintaining data corresponding to a most recent date for each unique identifier. Additionally, the transfer medium management system can determine whether the most recent date for each unique identifier is within a predefined time window (e.g., the last month, last 35 days, last 6 months, etc.). If the most recent date is outside of the predefined time window, the evaluation module may determine that a particular entity corresponding to the most recent date is ineligible for the transition. For example, the evaluation module can identify the particular entity using the unique identifier associated with the most recent date.

Additional criteria evaluated by the transfer medium management system can include variables that can be predictive of future resource usage. For example, the transfer medium management system can determine a debt-to-income (DTI) ratio by adjusting a monthly debt obligation with a credit limit of the secured transfer medium. The transfer medium management system can compare the DTI with a maximum threshold. Based on the comparison, the transfer medium management system can forgo from or proceed with transitioning the particular entity to the unsecured transfer medium. In particular, if the DTI is equal to or exceeds the maximum threshold, the particular entity can be ineligible for the unsecured transfer medium. Accordingly, the transfer medium management system can forgo from transitioning the particular entity to the unsecured transfer medium. As another example, the transfer medium management system can determine whether an income of the particular entity is above a minimum threshold. Based on the income being equal to or exceeding the minimum threshold, the transfer medium management system can proceed with transitioning the particular entity to the unsecured transfer medium.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
transmitting, by a transfer medium module and to an orchestration platform, a graduation request to initiate a transition of a secured transfer medium to an unsecured transfer medium, the secured transfer medium configured to be assigned to an entity after a portion of entity resources is received from the entity, wherein the graduation request is transmitted by the transfer medium module to the orchestration platform using a single application programming interface (API);
determining, by the transfer medium module, whether the transition to the unsecured transfer medium is successful;
in response to determining that the transition to the unsecured transfer medium is successful based on a response received from the orchestration platform:
generating, by the transfer medium module, a data entry in a database system, the data entry linking an identifier of the unsecured transfer medium to the entity; and
generating, by the transfer medium module, a user interface for presentation at a user device associated with the entity, the user interface comprising an indication that the transition to the unsecured transfer medium is successful; and
in response to determining that the transition to the unsecured transfer medium is unsuccessful:
evaluating, by the transfer medium module and based at least on information received from a communication channel communicatively coupling the transfer medium module and the orchestration platform, a transfer error associated with the transition to the unsecured transfer medium being unsuccessful;
determining, by the transfer medium module and based on the transfer error, a remediation action to resolve the transfer error; and
performing, by the transfer medium module, the remediation action.

2. The computer-implemented method of claim 1, wherein the graduation request comprises a unique identifier corresponding to the entity.

3. The computer-implemented method of claim 2, further comprising, in response to determining that the transition to the unsecured transfer medium is unsuccessful:
determining, by the transfer medium module, that the transfer error comprises a failure to transmit the unique identifier to the orchestration platform; and
reattempting, by the transfer medium module, to transmit the unique identifier to the orchestration platform as part of performing the remediation action.

4. The computer-implemented method of claim 1, further comprising, prior to transmitting the graduation request to initiate the transition of the secured transfer medium to the unsecured transfer medium:
receiving, by the transfer medium module and from an evaluation module, communication identifying the entity subsequent to the evaluation module determining that the entity is eligible to be transitioned to the unsecured transfer medium, wherein the evaluation module is configured to determine that the entity is eligible to be transitioned to the unsecured transfer medium based at least in part on a criteria-based evaluation of the entity.

5. The computer-implemented method of claim 4, wherein the evaluation module is configured to determine that the entity is eligible to be transitioned to the unsecured transfer medium based at least in part on entity information stored in the database system being consistent with one or more criteria.

6. A system, comprising:
one or more processors; and
one or more memories storing computer-executable instructions that, when executed by the one or more processors, causes the one or more processors to perform one or more operations comprising:
transmitting, by a transfer medium module and to an orchestration platform, a graduation request to initiate a transition of a secured transfer medium to an unsecured transfer medium, the secured transfer medium configured to be assigned to an entity after a portion of entity resources is received from the entity, wherein the graduation request is transmitted by the transfer medium module to the orchestration platform using a single application programming interface (API);
determining, by the transfer medium module, whether the transition to the unsecured transfer medium is successful;

in response to determining that that the transition to the unsecured transfer medium is successful based on a response received from the orchestration platform:

generating, by the transfer medium module, a data entry in a database system, the data entry linking an identifier of the unsecured transfer medium to the entity; and generating, by the transfer medium module, a user interface for presentation at a user device associated with the entity, the user interface comprising an indication that the transition to the unsecured transfer medium is successful; and in response to determining that the transition to the unsecured transfer medium is unsuccessful:

evaluating, by the transfer medium module and based at least on information received from a communication channel communicatively coupling the transfer medium module and the orchestration platform, a transfer error associated with the transition to the unsecured transfer medium being unsuccessful;

determining, by the transfer medium module and based on the transfer error, a remediation action to resolve the transfer error; and performing, by the transfer medium module, the remediation action.

7. The system of claim 6, wherein the graduation request comprises a unique identifier corresponding to the entity, and wherein the operations further comprise, in response to determining that the transition to the unsecured transfer medium is unsuccessful:

determining, by the transfer medium module, that the transfer error comprises a failure to transmit the unique identifier to the orchestration platform; and reattempting, by the transfer medium module, to transmit the unique identifier to the orchestration platform as part of performing the remediation action.

8. The system of claim 6, wherein the operations further comprise, prior to transmitting the graduation request to initiate the transition of the secured transfer medium to the unsecured transfer medium receiving, by the transfer medium module and from an evaluation module, communication identifying the entity subsequent to the evaluation module determining that the entity is eligible to be transitioned to the unsecured transfer medium, wherein the evaluation module is configured to determine that the entity is eligible to be transitioned to the unsecured transfer medium based at least in part on a criteria-based evaluation of the entity.

9. The system of claim 8, wherein the evaluation module is configured to determine that the entity is eligible to be transitioned to the unsecured transfer medium based at least in part on entity information stored in the database system being consistent with one or more criteria.

10. A non-transitory computer-readable storage medium storing computer-executable instructions that, when executed with one or more processors of a computing device, causes the computing device to perform one or more operations comprising:

transmitting, by a transfer medium module and to an orchestration platform, a graduation request to initiate a transition of a secured transfer medium to an unsecured transfer medium, the secured transfer medium configured to be assigned to an entity after a portion of entity resources is received from the entity, wherein the graduation request is transmitted by the transfer medium module to the orchestration platform using a single application programming interface (API);

determining, by the transfer medium module, whether the transition to the unsecured transfer medium is successful;

in response to determining that the transition to the unsecured transfer medium is successful based on a response received from the orchestration platform:

generating, by the transfer medium module, a data entry in a database system, the data entry linking an identifier of the unsecured transfer medium to the entity; and generating, by the transfer medium module, a user interface for presentation at a user device associated with the entity, the user interface comprising an indication that the transition to the unsecured transfer medium is successful; and in response to determining that the transition to the unsecured transfer medium is unsuccessful:

evaluating, by the transfer medium module and based at least on information received from a communication channel communicatively coupling the transfer medium module and the orchestration platform, a transfer error associated with the transition to the unsecured transfer medium being unsuccessful;

determining, by the transfer medium module and based on the transfer error, a remediation action to resolve the transfer error; and performing, by the transfer medium module, the remediation action.

11. The non-transitory computer-readable storage medium of claim 10, wherein the graduation request comprises a unique identifier corresponding to the entity, and wherein the operations further comprise, in response to determining that the transition to the unsecured transfer medium is unsuccessful:

determining, by the transfer medium module, that the transfer error comprises a failure to transmit the unique identifier to the orchestration platform; and reattempting, by the transfer medium module, to transmit the unique identifier to the orchestration platform as part of performing the remediation action.

12. The non-transitory computer-readable storage medium of claim 10, wherein the operations further comprise, prior to transmitting the graduation request to initiate the transition of the secured transfer medium to the unsecured transfer medium:

receiving, by the transfer medium module and from an evaluation module, communication identifying the entity subsequent to the evaluation module determining that the entity is eligible to be transitioned to the unsecured transfer medium, wherein the evaluation module is configured to determine that the entity is eligible to be transitioned to the unsecured transfer medium based at least in part on a criteria-based evaluation of the entity.

* * * * *